(12) United States Patent
Hosoda et al.

(10) Patent No.: US 11,165,318 B2
(45) Date of Patent: Nov. 2, 2021

(54) ELECTRIC CONDUCTOR INSERTION APPARATUS

(71) Applicant: HONDA MOTOR CO., LTD., Tokyo (JP)

(72) Inventors: Yuichi Hosoda, Tochigi-ken (JP); Takashi Yoshida, Tochigi-ken (JP); Takao Inoue, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 91 days.

(21) Appl. No.: 16/808,439

(22) Filed: Mar. 4, 2020

(65) Prior Publication Data
US 2020/0287448 A1 Sep. 10, 2020

(30) Foreign Application Priority Data
Mar. 7, 2019 (JP) .............................. JP2019-041154

(51) Int. Cl.
*H02K 15/06* (2006.01)
*H02K 23/00* (2006.01)
*B21K 23/00* (2006.01)

(52) U.S. Cl.
CPC ........... *H02K 15/064* (2013.01); *B21K 23/00* (2013.01); *H02K 15/06* (2013.01); *H02K 15/062* (2013.01); *Y10T 29/49009* (2015.01); *Y10T 29/53174* (2015.01)

(58) Field of Classification Search
CPC ...... H02K 15/02; H02K 15/024; H02K 15/06; H02K 15/062; H02K 15/064; Y10T 29/49009; Y10T 29/49073; Y10T 29/53143; Y10T 29/53152
See application file for complete search history.

(56) References Cited

U.S. PATENT DOCUMENTS

| 2014/0013592 A1 | 1/2014 | Yoshida et al. |
| 2016/0233749 A1* | 8/2016 | Ueno .................... H02K 15/085 |
| 2019/0081540 A1 | 3/2019 | Oka et al. |

FOREIGN PATENT DOCUMENTS

| JP | 5841017 | 1/2016 |
| WO | 2017/159875 | 9/2017 |

* cited by examiner

*Primary Examiner* — Peter Dungba Vo
*Assistant Examiner* — Joshua D Anderson
(74) *Attorney, Agent, or Firm* — Amin, Turocy & Watson, LLP

(57) ABSTRACT

An insertion apparatus includes a conductor guide member that guides a prescribed region of an electric conductor to a slot of a stator core, and a support body that supports the conductor guide member. In this configuration, the conductor guide member can float in an axial direction of the stator core.

10 Claims, 20 Drawing Sheets

(INSIDE) ← → (OUTSIDE)

(INSIDE) ← → (OUTSIDE)

ELECTRIC CONDUCTOR INSERTION APPARATUS

CROSS-REFERENCE TO RELATED APPLICATION

This application is based upon and claims the benefit of priority from Japanese Patent Application No. 2019-041154 filed on Mar. 7, 2019, the contents of which are incorporated herein by reference.

BACKGROUND OF THE INVENTION

Field of the Invention

The present invention relates to an electric conductor insertion apparatus for inserting a prescribed region of an electric conductor into a slot formed in a stator core.

Description of the Related Art

A stator forming a rotating electric machine such as a motor or generator is known that includes a stator core with slots formed therein and an electric conductor (referred to below as a "segment") that includes two leg portions and a curved portion, to be substantially U-shaped. The leg portions are inserted into the slots in this stator, and the leg portions exposed from the slots are electrically connected to each other.

Insulating paper is housed in advance inside the slots. The applicant submitting the present application proposes an insertion apparatus in which, in Japanese Patent No. 5841017, two sets of a first expansion plate and a second expansion plate that are capable of guiding leg portions while being inserted into the slots and pressing the insulating paper are included. In this case, the insulating paper is pressed against the inner walls of the slots, and therefore the leg portions are prevented from pulling off the insulating paper when the leg portions of the segment are inserted into the slots. As a result, the insulating paper is prevented from being pushed out of the slots and becoming damaged.

It should be noted that the stator core is usually formed by layering a plurality of electromagnetic steel sheets that are thin and ring-shaped. The thickness of a single electromagnetic steel sheet is not uniform across the entirety thereof, and actually differs within a certain tolerance range depending on the region. Accordingly, when the stator core is formed, the layered thickness (height) of the stator core is also not uniform, and differs within a certain tolerance range depending on the region. When the first expansion plate and the second expansion plate are simultaneously inserted into respective slots of the stator core having such a variation in height, it is possible that the first expansion plate and the second expansion plate are inserted into the slots formed at high regions, but not yet inserted into slots formed at low regions. In such a case, for the low regions, the guidance by the first expansion plate and the second expansion plate only continues until the leg portions are partway into the slots.

In light of this, the applicant submitting the present application has proposed, in International Publication No. 2017/159875, an insertion apparatus that causes the height of the stator core to be uniform by pressing the stator core with a pressing element.

SUMMARY OF THE INVENTION

The main objective of the present invention is to provide an electric conductor insertion apparatus that can continue the guidance of a prescribed region of an electric conductor by a conductor guide member until this prescribed region is inserted into a slot, even in a case where the height (thickness) of the stator core varies.

According to an embodiment of the present invention, provided is an electric conductor insertion apparatus that inserts a prescribed region of an electric conductor into a slot of a stator core in which a plurality of the slots are formed, where each slot includes diameter-direction edges extending along a diameter direction of the stator core and circumferential-direction edges extending in a circumferential direction and has insulating paper arranged therein, the electric conductor insertion apparatus comprising a conductor guide member that guides the prescribed region of the electric conductor into the slot; and a support body that supports the conductor guide member, wherein the conductor guide member is provided in a manner to be floatable in an axial direction of the stator core.

To provide the conductor guide member in floatable manner in the axial direction, as an example, a holding member may be interposed between a support body that supports the conductor guide member that guides the prescribed region of the electric conductor and a support body actuator that displaces the support body along the diameter direction of the stator core, and the support body may be held in a floating manner relative to the holding member.

According to the present embodiment, the conductor guide member is provided in a manner to be floatable in the axial direction of the stator core. Therefore, in a case where there is variation in the thickness of the stator core such that there is a high region (high-altitude region) and a low region (low-altitude region), it is possible to further displace the support body corresponding to the low-altitude region in a state where the support body corresponding to the high-altitude region has been stopped.

Accordingly, for the support body corresponding to the low-altitude region as well, the insulating paper is pressed against the inner wall of the slot by the conductor guide member supported on this support body. Therefore, when the prescribed region of the electric conductor is being inserted into the slot, it is possible to avoid positional skew of the insulating paper and damage to the insulating paper.

Furthermore, in such a case, there is no need to make the thickness uniform across the entire circumference of the stator core by pressing the stator core, and therefore it is possible to reduce the rigidity of the equipment of the overall insertion apparatus, and also to make the equipment smaller and lower-cost.

The above and other features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of an electric conductor insertion apparatus, while referencing the accompanying drawings. In the following description, the electric conductor insertion apparatus is also referred to as a "leg portion insertion apparatus".

Figure 1:
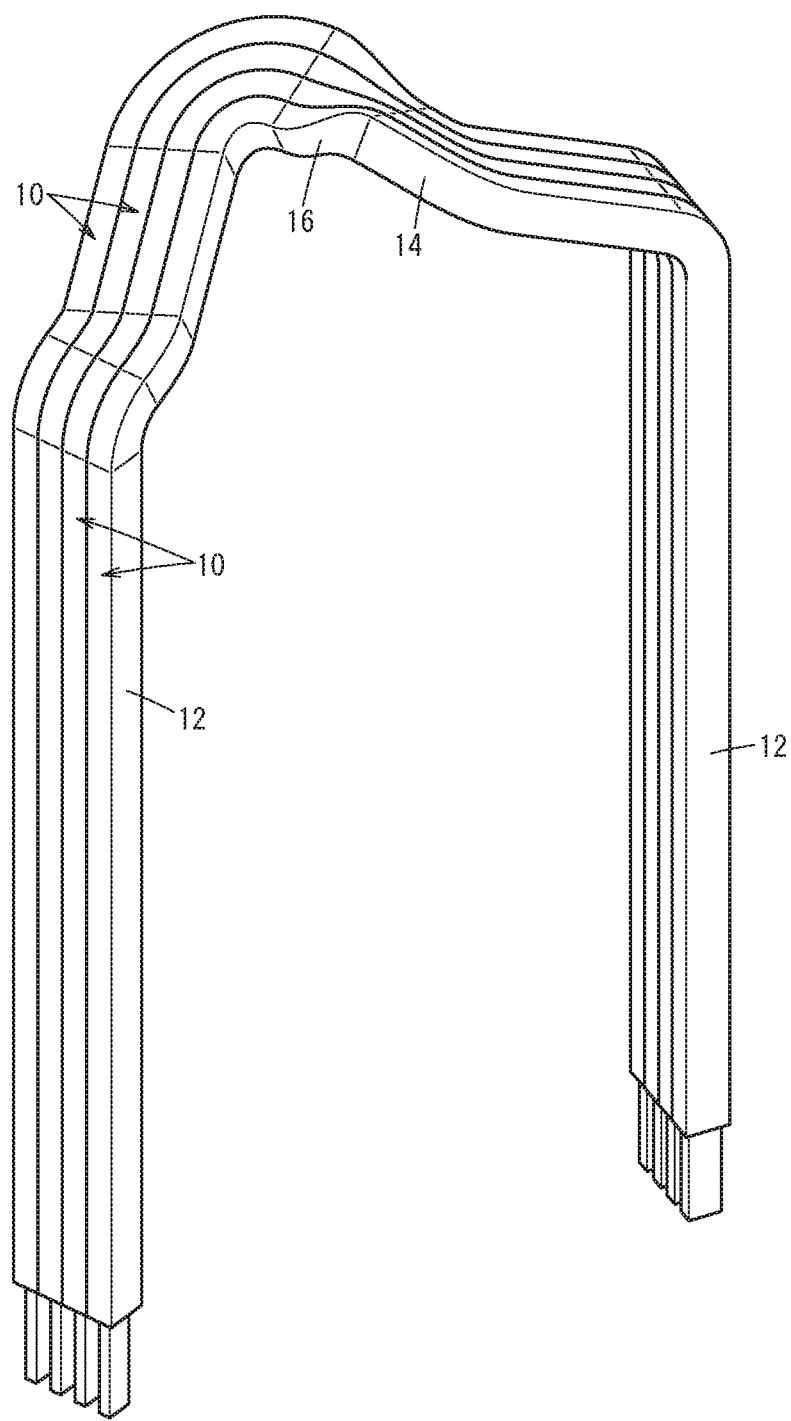
FIG. 1 is a schematic overall perspective view of an electric conductor (segment) serving as an electromagnetic coil of a stator.

First, a segment 10 (electric conductor) shown in FIG. 1 will be explained. The segment 10 includes two leg portions 12 and a turn portion 14 interposed between the leg portions 12. The turn portion 14 is curved from one leg portion 12 to the other leg portion 12, such that the segment 10 is substantially U-shaped.

A serpentine crank portion 16 is formed in the turn portion 14. Due to this crank portion 16, a skew occurs in the direction along the radial direction of the stator core in the segment 10.

Figure 2:
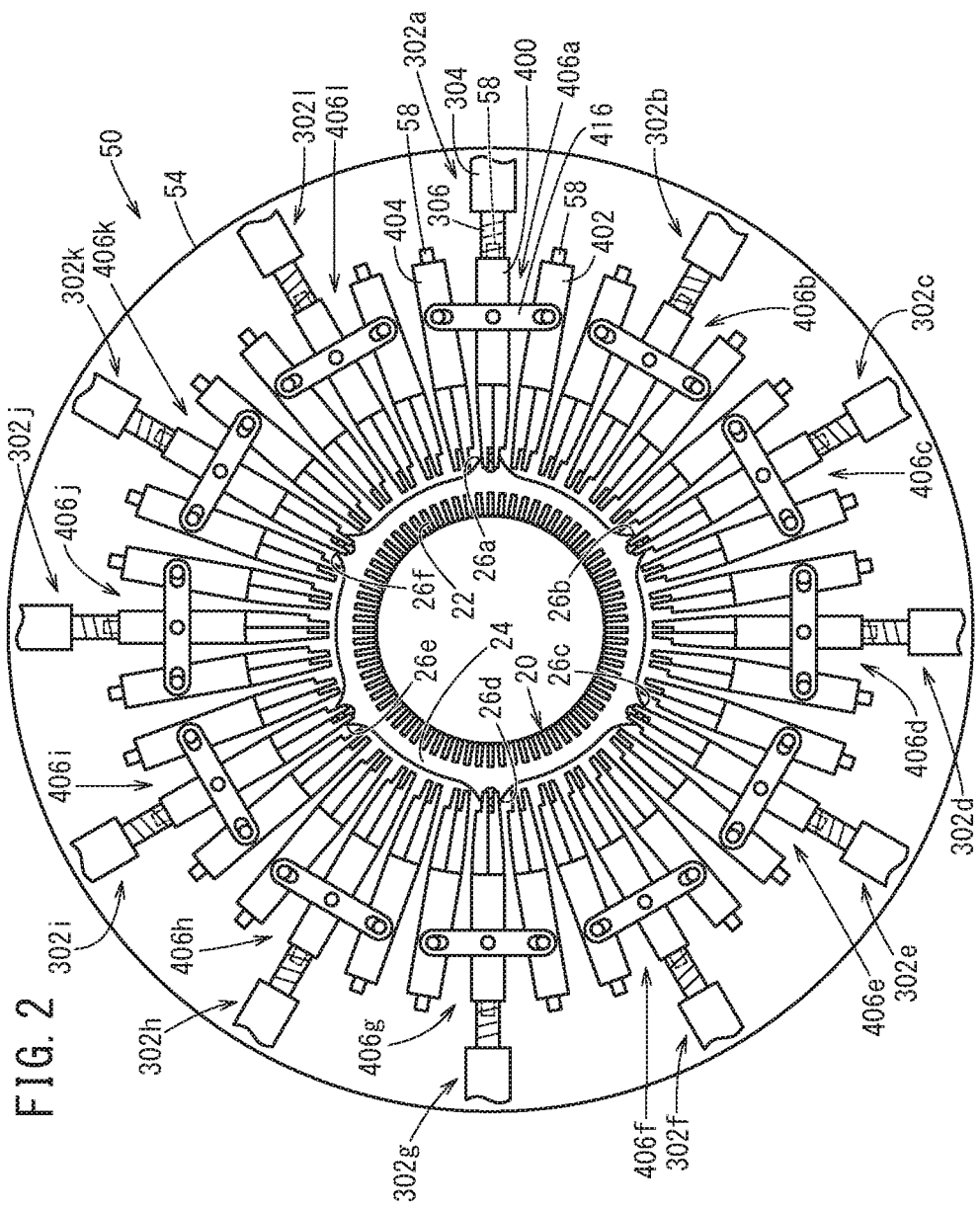
FIG. 2 is a schematic planar view showing a stator core into which a leg portion (prescribed region) of the segment is to be inserted, and an outer guide portion.
Figure 3:
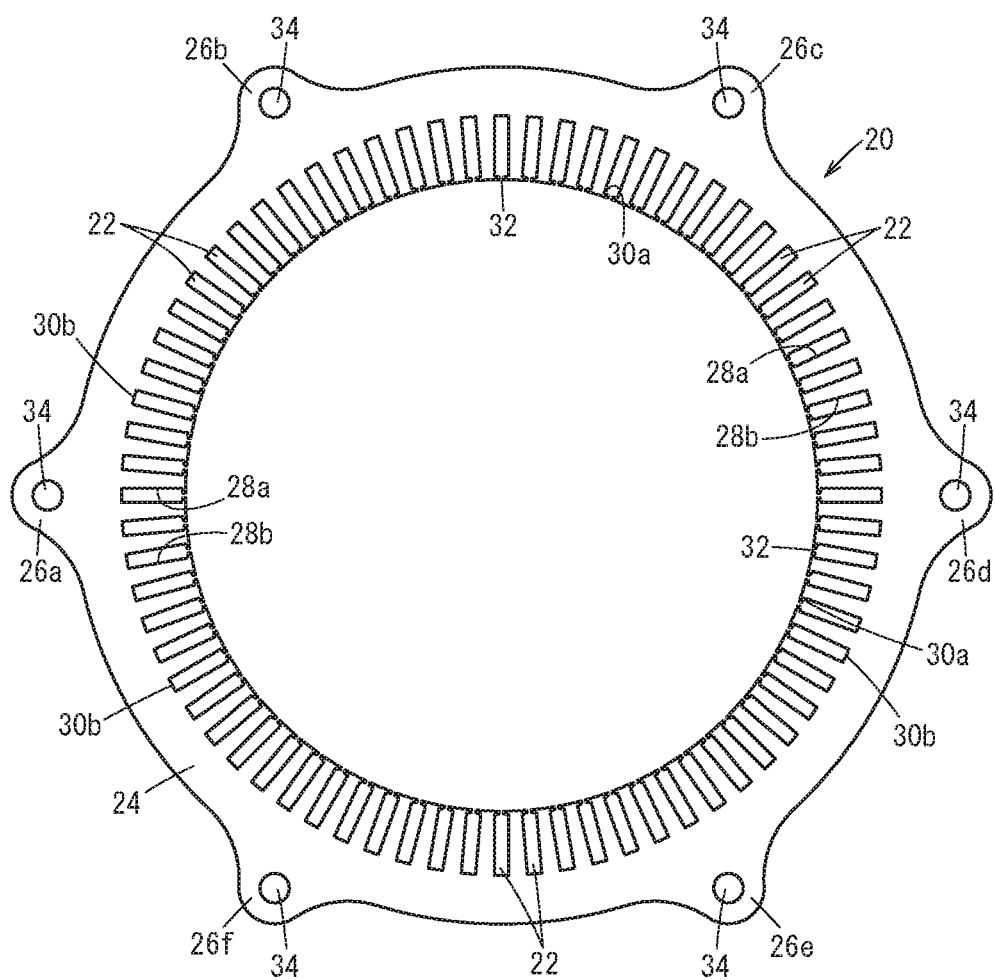
FIG. 3 is an enlarged planar view of the stator core shown in FIG. 2.

The leg portions 12 are inserted into a plurality of slots 22 formed in a stator core 20 shown in FIGS. 2 and 3. The stator core 20 is formed as a layered body in which thin core plates are stacked in a direction orthogonal to the plane of the drawing in FIG. 2, and includes an annular portion 24 and a plurality of tab portions (the six tab portions, from the first tab portion 26a to the sixth tab portion 26f, in the present embodiment) that protrude outward in a diameter direction from the outer periphery of the annular portion 24. The slots 22 are formed extending radially on the inner peripheral side of the annular portion 24. In this case, the number of slots 22 is 72.

Each slot 22 has a long direction that is a direction extending along the diameter direction of the annular portion 24. Ultimately, as shown in FIG. 3, each slot 22 includes two long edges (diameter direction edges) extending along the diameter direction of the annular portion 24, namely the first long edge 28a on the downstream side in a clockwise direction and the second long edge 28b on the upstream side in the clockwise direction, and two short edges (circumference direction edges) extending along the circumferential direction of the annular portion 24, namely the first short edge 30a on the inner peripheral side and the second short edge 30b on the outer peripheral side. A portion of the first short edge 30a is notched. Due to this notch, an inner peripheral groove 32 that opens toward the inner peripheral side of the annular portion 24 is formed in the first short edge 30a.

The first tab portion 26a to sixth tab portion 26f are provided separated from each other by uniform intervals. The first tab portion 26a to sixth tab portion 26f have the outer peripheral portion of the annular portion 24 as bases, and have shapes approximated to isosceles triangles whose base edges are longest, while the protruding tips are curved and rounded. A fastening hole 34 is formed in the substantial center of each of the first tab portion 26a to sixth tab portion 26f. A bolt (not shown in the drawings), which is a fastening member for connecting a stator ST (see FIG. 20) to a casing and also for tightening core plates to each other, passes through each fastening hole 34.

The following describes the leg insertion apparatus (electric conductor insertion apparatus) for inserting the leg portions 12 of the segment 10 into the slots 22. The leg insertion apparatus includes an outer guide portion 50 shown in FIGS. 2 and 4 and an inner guide portion 52 (second support body) shown in FIG. 4. The outer guide portion 50 surrounds the outer periphery of the stator core 20 positionally fixed at a prescribed region of the leg insertion apparatus, and the inner guide portion 52 is inserted in a manner to be capable of moving back and forth on the inner peripheral side of the stator core 20.

Figure 4:
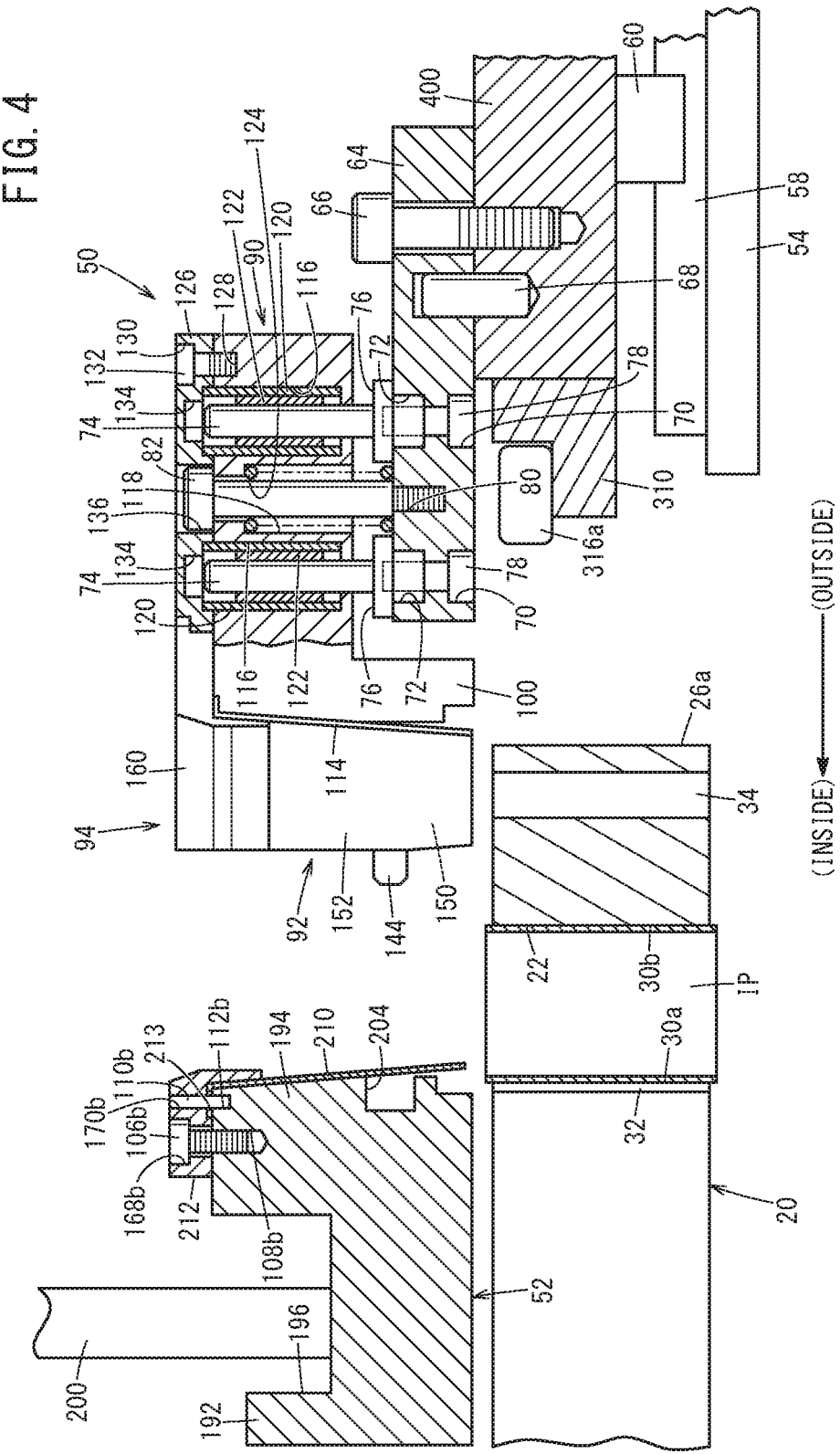
FIG. 4 is a partial cross-sectional side view of an inner guide portion, the stator core, and the outer guide portion.

The outer guide portion 50 includes a platform 54 shaped as a circular plate, shown in FIGS. 2 and 4. 36 guide rails 58, which extend along the diameter direction of the annular portion 24, are installed on the platform 54, and one of a driving slider 400, a first driven slider 402, and a second driven slider 404 is provided in a manner to be displaceable on each guide rail 58, with a sliding body 60 provided therebetween. Each driving slider 400 is arranged in a manner to be sandwiched between a first driven slider 402 and a second driven slider 404. Each set of a driving slider 400, a first driven slider 402, and a second driven slider 404 forms one slider unit. In the present embodiment, 12 slider units are provided, namely a first slider unit 406a to a twelfth slider unit 406l.

Figure 5:
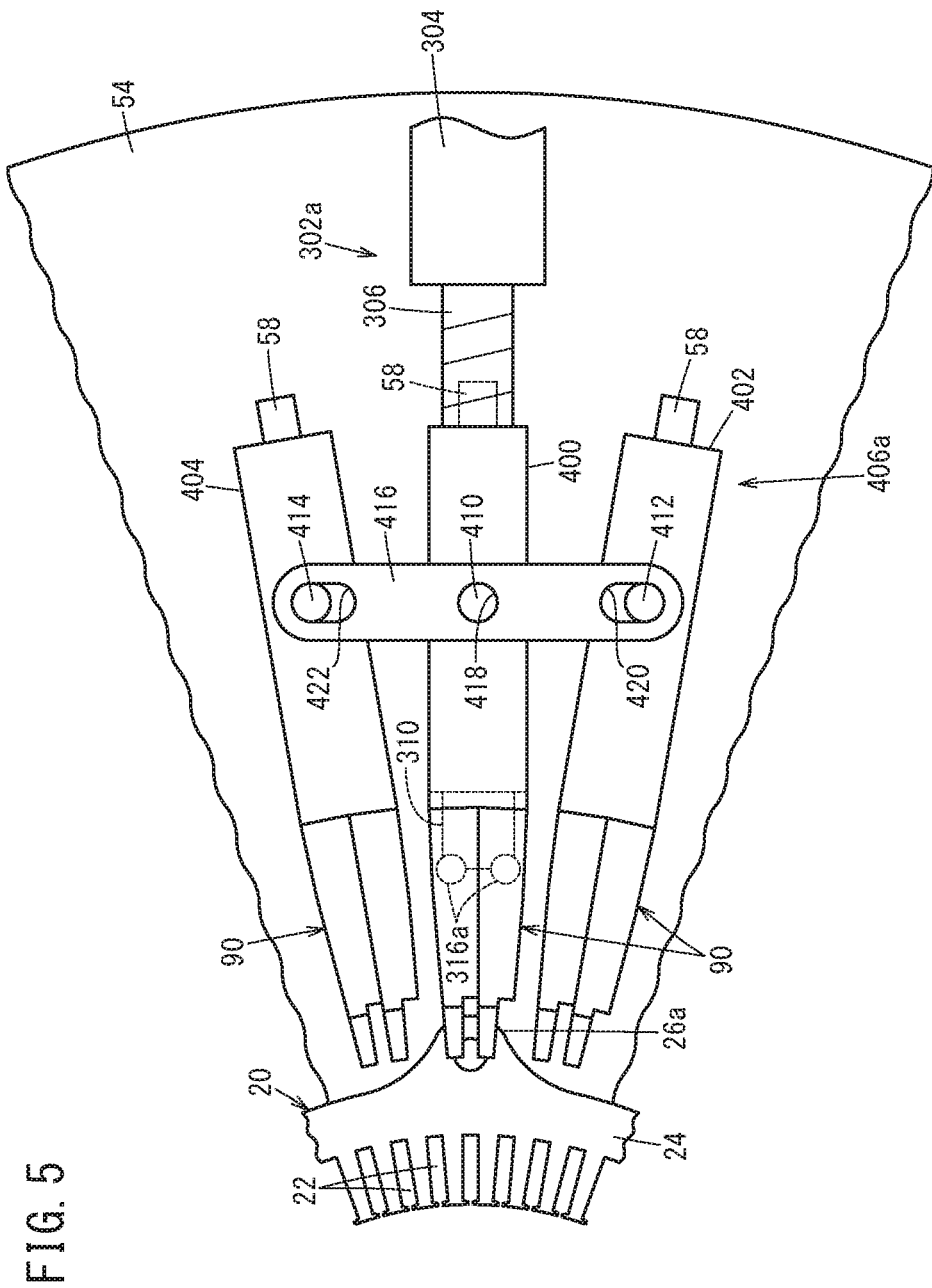
FIG. 5 is a schematic planar view of the main components of a slider unit formed by a driving slider, a first driven slider, and a second driven slider.

As shown in detail in FIG. 5, a pin-shaped fitting portion 410 is formed protruding from the top surface of the driving slider 400, a first displacement support cam follower 412 is formed protruding from the top surface of the first driven slider 402, and a second displacement support cam follower 414 is formed protruding from the top surface of the second driven slider 404. Furthermore, a long flat plate-shaped link member 416 spans from the first driven slider 402, through the driving slider 400, to the second driven slider 404. A connection hole 418 is formed penetrating through the link member 416 in a substantial center portion in the longitudinal direction thereof, and a first long hole 420 and second long hole 422 are formed penetrating through respective ends of the link member 416. The pin-shaped fitting portion 410 is fitted into the connection hole 418, the first displacement support cam follower 412 passes through the first long hole 420, and the second displacement support cam follower 414 passes through the second long hole 422.

The first slider unit 406a to twelfth slider unit 406l are operated respectively by a first actuator 302a to twelfth actuator 302l (support body actuators), to be displaced toward or away from each other along the diameter direction of the annular portion 24 of the stator core 20. More specifically, the first actuator 302a to twelfth actuator 302l each include a servo motor 304 and a guide shaft 306 that moves forward and backward under the effect of the servo motor 304. As shown by the first actuator 302a in FIG. 5, for example, the tip of the guide shaft 306 of the first actuator 302a is connected to the driving slider 400.

Essentially, when the guide shaft 306 of the first actuator 302a moves forward or backward, the driving slider 400 moves forward or backward integrally with the guide shaft 306. The first driven slider 402 and the second driven slider 404 are connected to the driving slider 400 via the link member 416, and therefore the first driven slider 402 and the second driven slider 404 move backward or forward following the driving slider 400.

Figure 12:
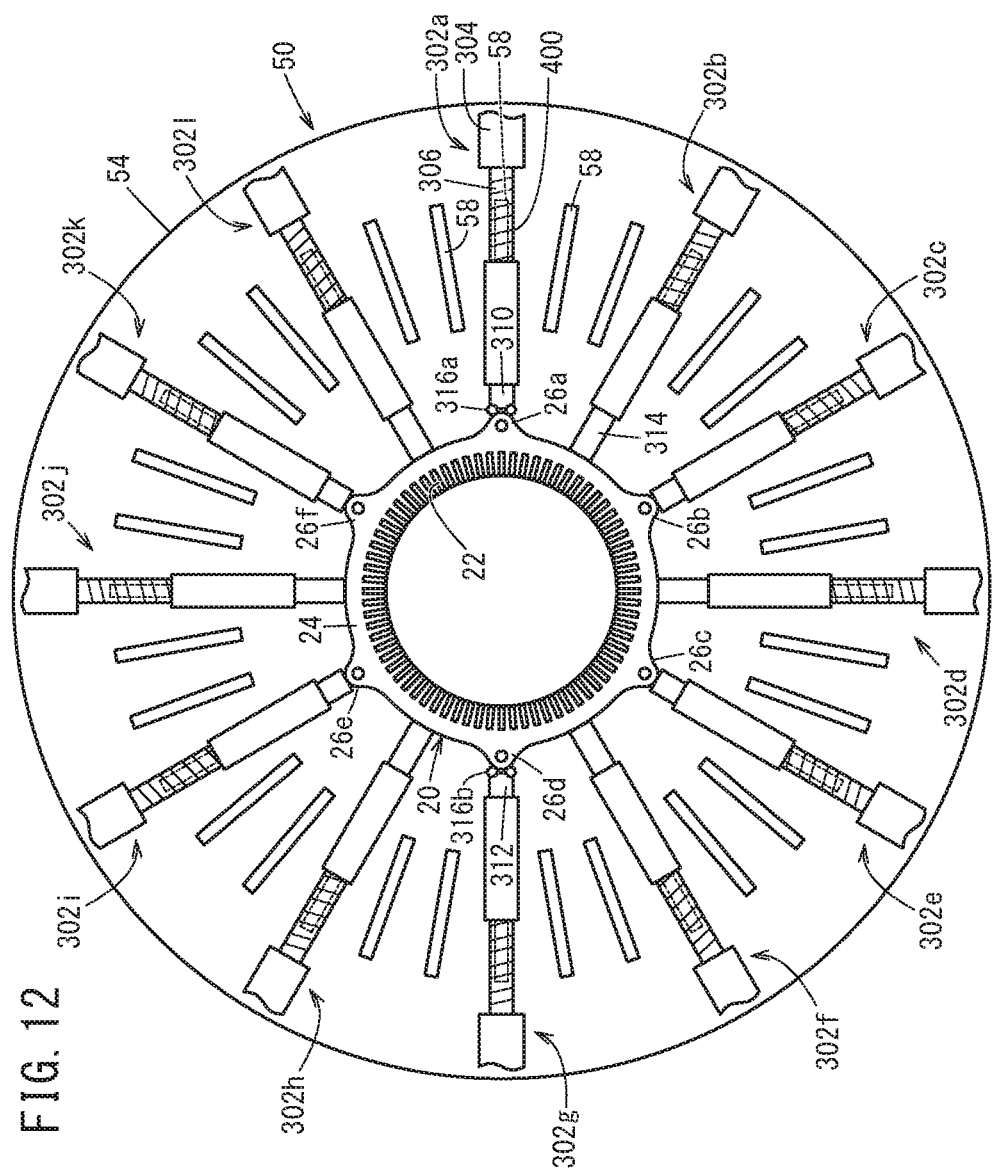
FIG. 12 is a schematic planar view schematically showing a state in which the engagement element, the sub-engagement element, and the pressing element provided to the driving slider are pressing the stator core to the inner peripheral side.

Here, the front end of the driving slider 400 of the first actuator 302a facing the stator core 20 is provided with an engagement element 310 capable of engaging with the first tab portion 26a, and the front end of the driving slider 400 of the seventh actuator 302g facing the stator core 20 is provided with a sub-engagement element 312 capable of engaging with the fourth tab portion 26d (see FIG. 12 in particular). The engagement element 310 and the sub-engagement element 312 have a positional relationship of being opposite each other, and the phase difference therebetween is 180°.

Figure 6:
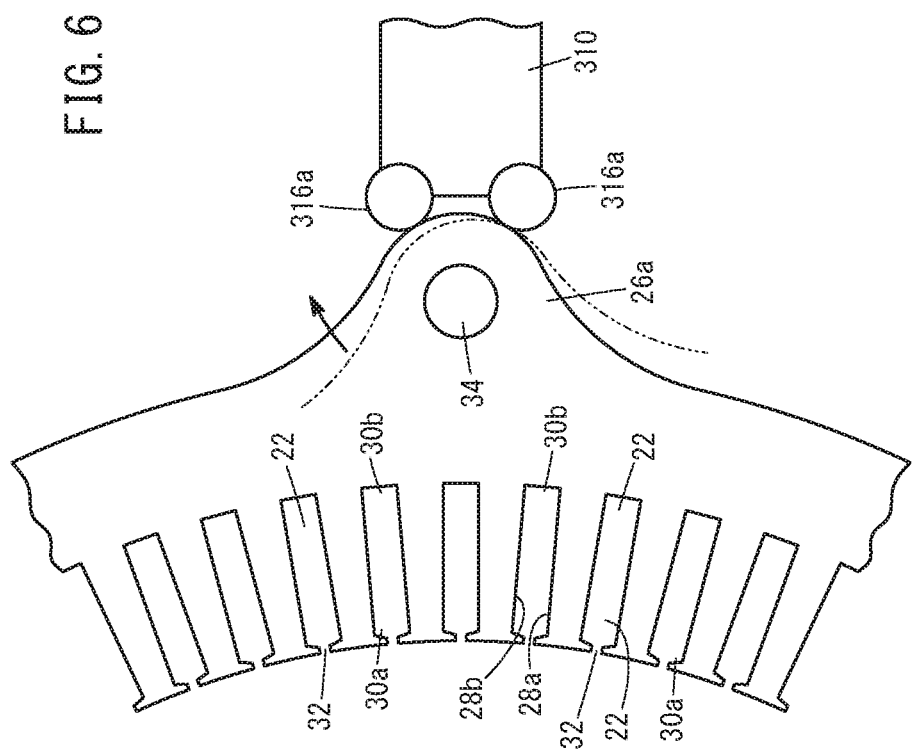
FIG. 6 is an enlarged view of the main components of a first tab portion (engagement portion) of the stator core and an engagement element provided to the driving slider.

FIG. 6 is an enlarged planar view of the main components of the engagement element 310. A bracket 64, a support block 90, and the like, which are described further below (see FIG. 4 for all), are omitted from the drawing. As shown in FIG. 6, the tip of the engagement element 310 is provided with a set of alignment cam followers 316a, serving as a rotating body. The first tab portion 26a enters between the alignment cam followers 316a and is engaged. Similarly, the tip of the sub-engagement element 312 is provided with a set of alignment cam followers 316b (see FIG. 12). The fourth tab portion 26d enters between the alignment cam followers 316b and is engaged.

In contrast to this, a pressing element 314, whose tip is a flat surface, is formed in a protruding manner on each driving slider 400 of the remaining second actuator 302b to sixth actuator 302f and the eighth actuator 302h to twelfth actuator 302l. Among these, the pressing elements 314 of the third actuator 302c, the fifth actuator 302e, the ninth actuator 302i, and the eleventh actuator 302k respectively contact the tips of the second tab portion 26b, the third tab portion 26c, the fifth tab portion 26e, and the sixth tab portion 26f. Furthermore, the pressing element 314 of the second actuator 302b contacts an outer edge between the first tab portion 26a and the second tab portion 26b, and the pressing element 314 of the fourth actuator 302d contacts an outer edge between the second tab portion 26b and the third tab portion 26c. Similarly, the pressing elements 314 of the sixth actuator 302f, the eighth actuator 302h, the tenth actuator 302j, and the twelfth actuator 302l respectively contact the outer edge between the third tab portion 26c and the fourth tab portion 26d, the outer edge between the fourth tab portion 26d and the fifth tab portion 26e, the outer edge between the fifth tab portion 26e and the sixth tab portion 26f, and the outer edge between the sixth tab portion 26f and the first tab portion 26a.

A bracket 64, serving as a holding member, is provided on the top surface of each of the driving slider 400, the first driven slider 402, and the second driven slider 404 (see FIG. 4). The brackets 64 protrude farther toward the outer periphery of the stator core 20 than the driving slider 400, the first driven slider 402, and the second driven slider 404, and are connected to the driving slider 400, the first driven slider 402, or the second driven slider 404 via connection bolts 66 and connection pins 68.

Two stepped holes 70 are formed on the lower surface side of each bracket 64 at the tip protruding to the stator core 20 side, and two attachment holes 72 are formed on the upper surface side thereof. The two stepped holes 70 are arranged on the inner peripheral side and the outer peripheral side in the diameter direction of the annular portion 24, and the two attachment holes 72 are connected respectively to the stepped holes 70. A short head portion of a guide rod 74, which is one support body guide member, is inserted into each attachment hole 72. A flange portion 76 with a larger diameter than the head portion is formed on the guide rod 74, and this flange portion 76 is blocked near the opening of the attachment hole 72.

Furthermore, a female screw portion is formed on the head of the guide rod 74, and a male screw portion of a mounting bolt 78 that has passed through the stepped hole 70 is screwed into the female screw portion. In this way, the guide rod 74 is positionally fixed to the attachment hole 72. The stepped portion in the stepped hole 70 becomes a stopper of the head portion of the mounting bolt 78.

The bracket 64 is further provided with a screw hole 80 having a female screw portion formed on the inner peripheral wall between the attachment holes 72. A male screw portion of the guide bolt 82, which is one support body guide member, is screwed into the screw hole 80. The support block 90 (support body) is supported in a so-called floating manner on the bracket 64, via a coil spring 124, described further below, through which the guide bolt 82 passes. In this way, the brackets 64 are interposed between the first actuator 302a to twelfth actuator 302l, which are support body actuators (diameter-direction displacement mechanisms)

and the support block 90, which is a support body, and realizes the role of a holding member for holding the support block 90 to the first actuator 302a to twelfth actuator 302l. The floating direction of the support block 90 is the axial direction of the stator core 20, that is, the height (thickness) direction orthogonal to the diameter direction.

Figure 7:
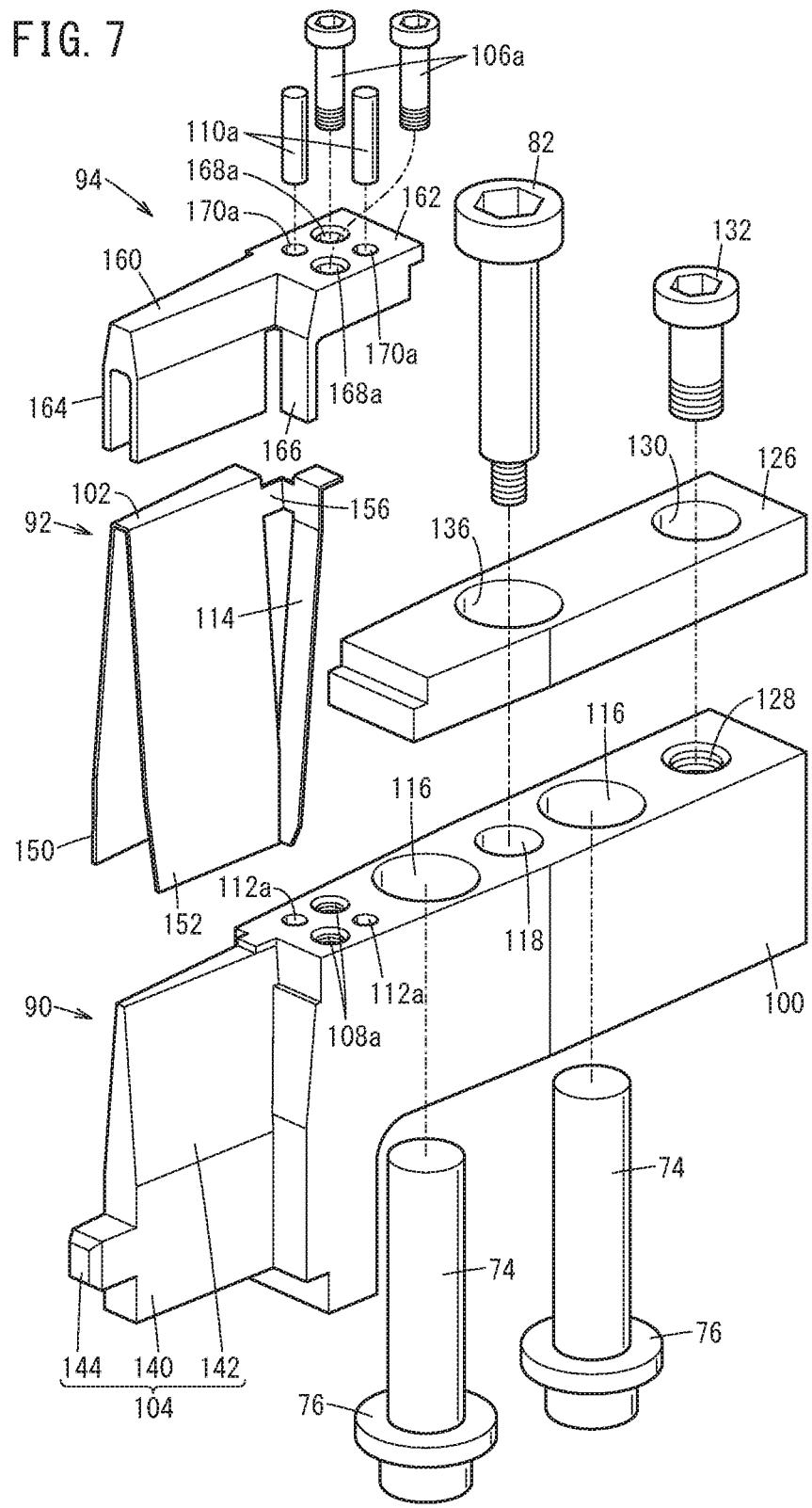
FIG. 7 is a schematic exploded perspective view of a support block that is a support body, a three-direction guide member that is a conductor guide member, and an outer cap member for holding the three-direction guide member on the support block.

FIG. 7 is a schematic exploded perspective view of the support block 90, a three-direction guide member 92 (conductor guide member), and an outer cap member 94. Describing the support block 90 first, the support block 90 includes a block body portion 100, and a bending portion mounting portion 104 on which is mounted a bending portion 102 forming the three-direction guide member 92. Among these, the block body portion 100 extends along the diameter direction of the annular portion 24. Furthermore, as shown in FIG. 7, a bolt fastening hole 108a into which a fastening bolt 106a is screwed and a pin fitting hole 112a in which a positioning pin 110a is fitted are formed on a top surface of the block body portion 100 at an end portion thereof on the inner peripheral side near the stator core 20. The bolt fastening hole 108a and the pin fitting hole 112a have a so-called staggered arrangement.

A second short-edge-side guide portion 114 (outward side guide portion), described further below, of the three-direction guide member 92 is mounted on the top surface of the block body portion 100 on an end portion thereof on the side near the stator core 20. Essentially, the block body portion 100 realizes the role of an outer side guide portion mounting portion. A slight clearance (retreat space) is formed between the second short-edge-side guide portion 114 and the bottom end of the block body portion 100.

Two rod insertion holes 116 that extend along the height direction and have the guide rods 74 inserted therethrough and a bolt insertion hole 118 that has the guide bolt 82 inserted therethrough are formed in parallel along the longitudinal direction (diameter direction of the annular portion 24), in the block body portion 100. Obviously, the two rod insertion holes 116 are at positions sandwiching the bolt insertion hole 118. As understood from FIG. 4, the two rod insertion holes 116 are each a stepped penetrating hole in which the inner diameter of the bottom end is small and the inner diameter of the other portion, which is a majority portion, is large, and the bolt insertion hole 118 is a stepped penetrating hole in which the inner diameter of the top end is small and the inner diameter of the other portion, which is a majority portion, is large.

A sleeve 120 is inserted into the rod insertion hole 116. The sleeve 120 is supported by a stepped portion formed based on the inner diameter difference of the rod insertion hole 116. A slide guide 122 is gripped by the sleeve 120 and the guide rods 74. The slide guide 122 fulfills a role of smoothly moving the guide rods 74 to be raised or lowered relative to the slide guide 122.

On the other hand, the coil spring 124, serving as an elastic member, is inserted into the bolt insertion hole 118. The guide bolt 82 passes through the inside of the coil spring 124, as described above. The bottom end of the coil spring 124 sits near an opening of the screw hole 80, on the top surface of the bracket 64. The top end of the coil spring 124 contacts a stepped portion formed based on the internal diameter difference of the bolt insertion hole 118.

Therefore, the coil spring 124 elastically biases the support block 90 in a direction away from the bracket 64. The coil spring 124 is compressed when affected by a force in a direction pressing the support block 90 to the bracket 64 side, thereby causing the support block 90 to be displaced toward the bracket 64. On the other hand, when this force is removed from the support block 90, the coil spring 124 expands and the support block 90 is displaced in a direction away from the bracket 64. The guide rods 74 and the guide bolt 82 guide the support block 90 when this displacement occurs.

The top ends of the guide rods 74 protrude slightly from the rod insertion hole 116. Similarly, the top end (head portion) of the guide bolt 82 protrudes slightly from the bolt insertion hole 118. A head cover 126, in which the top ends protruding in this manner are buried, is connected to the block body portion 100. Essentially, the support hole 128 and the support hole 130 are formed near the outer end portions of the block body portion 100 and the head cover 126, respectively. A male screw portion of the support bolt 132 passed through the support hole 128 is screwed into a female screw portion formed in an inner peripheral wall of the support hole 130, thereby positionally fixing the head cover 126 relative to the block body portion 100.

Two rod receiving holes 134 and a bolt entry hole 136 are formed in the bottom surface of the head cover 126. The rod receiving holes 134 cover the top ends of the guide rods 74, and the head portion of the guide bolt 82 is inserted into the bolt entry hole 136. When the support block 90 is raised relative to the driving slider 400, the first driven slider 402, or the second driven slider 404, the top surfaces of the guide rods 74 are sufficiently moved away from the ceiling surface of the rod receiving hole 134.

The bending portion mounting portion 104 is formed on an end surface of the block body portion 100 on the inner peripheral side facing the annular portion 24, in a manner to protrude toward the annular portion 24. As shown in FIG. 7, the bending portion mounting portion 104 includes a uniform width portion 140 having a substantially constant width along the circumferential direction of the annular portion 24 and having a substantially rectangular parallelepiped shape, and an expanded width portion 142 that has a substantially triangular prism shape and becomes wider heading from the top to the bottom. An engagement protrusion 144 (second engagement portion) pointing toward the annular portion 24 is formed in a protruding manner in the uniform width portion 140.

Figure 8:
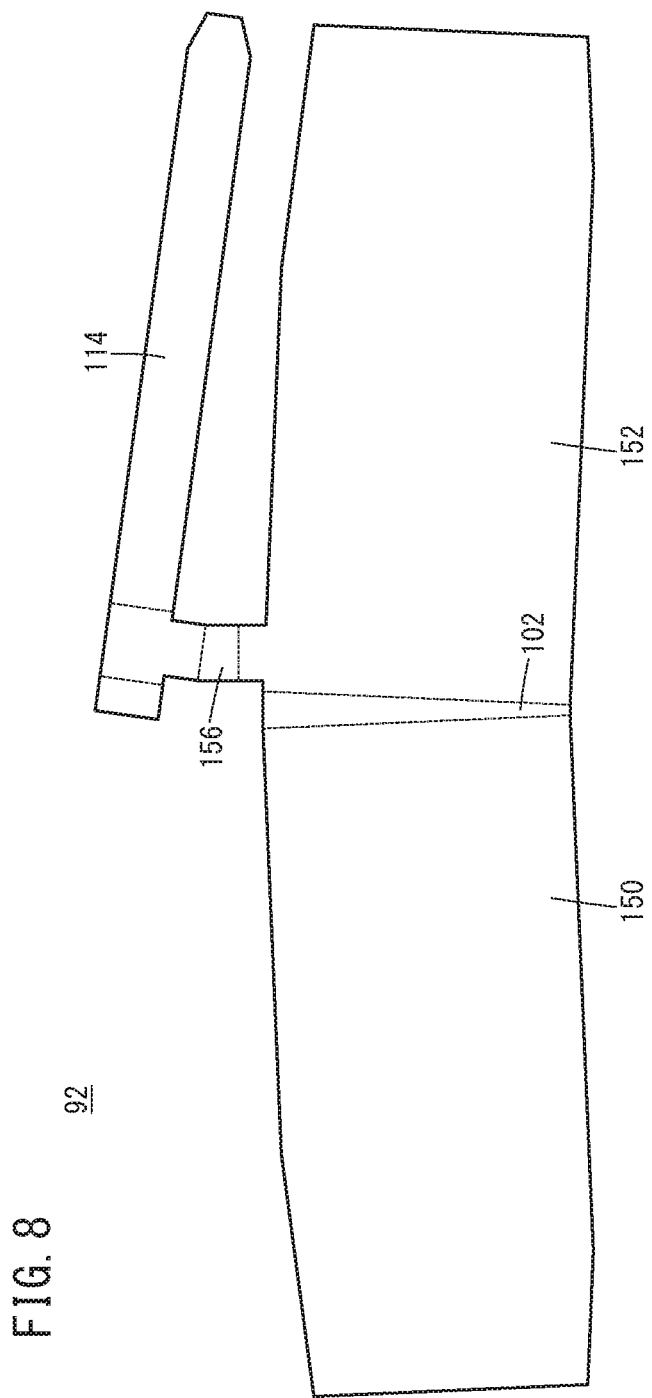
FIG. 8 is an expanded view of the three-direction guide member.

The three-direction guide member 92 (conductor guide member), whose expanded view is shown in FIG. 8, is supported by the bending portion mounting portion 104. As understood from FIGS. 7 and 8, the three-direction guide member 92 is formed as a single member in which a first long-edge-side guide portion 150 (first diameter-direction-edge-side guide portion), a second long-edge-side guide portion 152 (second diameter-direction-edge-side guide portion), and the second short-edge-side guide portion 114 are formed integrally. The first long-edge-side guide portion 150 and the second long-edge-side guide portion 152 are provided by bending a large tongue portion that is substantially rectangular to have a prescribed angle, preferably an angle that is slightly larger than an intersection angle between the inclined surfaces of the expanded width portion 142.

Figure 9:
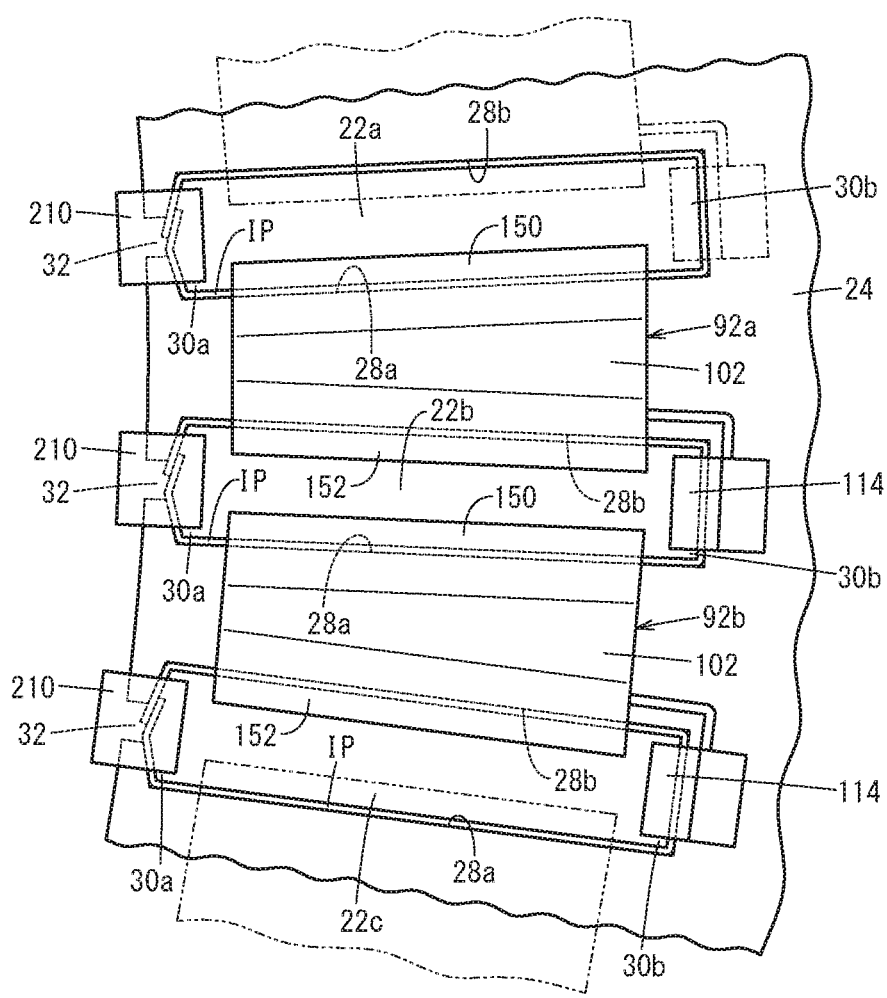
FIG. 9 is an enlarged planar view of the main components schematically shown in a state where a first long-edge-side guide portion, a second long-edge-side guide portion, and a second short-edge-side guide portion of the three-direction guide portion are near the slot.

The first long-edge-side guide portion 150 and the second long-edge-side guide portion 152 of a single three-direction guide member 92 are positioned respectively near separate slots 22, as shown in FIG. 9. For convenience, among the plurality of slots 22, any three slots 22 arranged in parallel along the circumferential direction are referred to as a first slot 22a, a second slot 22b, and a third slot 22c, and any two three-direction guide members 92 that are adjacent to each other along the circumferential direction are referred to as a first three-direction guide member 92a and a second three-direction guide member 92b. The first long-edge-side guide portion 150 of the first three-direction guide member 92*a* is close to the first slot 22*a* from the first long edge 28*a* side of the first slot 22*a*, and the second long-edge-side guide portion 152 is near the second slot 22*b* from the second long edge 28*b* side of the second slot 22*b*. Furthermore, the first long-edge-side guide portion 150 of the second three-direction guide member 92*b* is positioned near the second slot 22*b* from the first long edge 28*a* side of the second slot 22*b*. The second long-edge-side guide portion 152 of this second three-direction guide member 92*b* is positioned near the third slot 22*c* from the second long edge 28*b* side of the third slot 22*c*.

In this way, the first long-edge-side guide portion 150 of a three-direction guide member 92 and the second long-edge-side guide portion 152 of an adjacent three-direction guide member 92 respectively face the first long edge 28*a* and the second long edge 28*b* of the same slot 22. In other words, the first long-edge-side guide portion 150 and the second long-edge-side guide portion 152 of one three-direction guide member 92 are respectively close to slots 22 that are adjacent to each other.

The second short-edge-side guide portion 114 is connected to the second long-edge-side guide portion 152, via a bridge portion 156 that is slightly inclined. The second short-edge-side guide portion 114 extends bidirectionally from the location of the connection to the bridge portion 156, in a manner to be substantially orthogonal thereto. A short extension region of the second short-edge-side guide portion 114 is bent from the tip surface of the block body portion 100 in the inner peripheral direction toward the top surface, and is mounted on this top surface while also being gripped by this top surface and the outer cap member 94. On the other hand, a long extension region of the second short-edge-side guide portion 114 is near the second long-edge-side guide portion 152 and the same slot 22. In the example described above, the second short-edge-side guide portion 114 of the second three-direction guide member 92*b* is near the second long-edge-side guide portion 152 and the second slot 22*b*.

The first long-edge-side guide portion 150 is inclined in a direction away from the second slot 22*b*, heading downward from the first slot 22*a*. Furthermore, the second long-edge-side guide portion 152 is inclined in a direction toward the third slot 22*c*, heading downward from the second slot 22*b*. Furthermore, the second short-edge-side guide portion 114 is inclined toward the first short edge 30*a*, heading downward.

In the three-direction guide member 92 formed in this manner, the first long-edge-side guide portion 150 and the second long-edge-side guide portion 152 are arranged along the inclined surfaces of the turn portion 142, which is a portion of the support block 90, and the bending portion 102 is mounted at the peak (intersection point between the inclined surfaces) of the turn portion 142.

In the manner described above, the three-direction guide member 92 supported by the support block 90 is covered by the outer cap member 94. The outer cap member 94 is a single member that includes a bending portion gripping portion 160 and a second short-edge-side guide portion gripping portion 162 (outer-edge-side guide portion gripping portion) in an integrated manner.

The bending portion gripping portion 160 is provided with an insertion groove 164 that protrudes in the inner peripheral direction from an inner peripheral tip of the second short-edge-side guide portion gripping portion 162 and is substantially shaped as an inverted U opening downward. The two sidewalls defining the insertion groove 164 grip the first long-edge-side guide portion 150 and the second long-edge-side guide portion 152. In a case where the intersection angle (the bending angle of the bending portion 102) between the first long-edge-side guide portion 150 and the second long-edge-side guide portion 152 is larger than the intersection angle between the inclined surfaces of the turn portion 142, when the first long-edge-side guide portion 150 and the second long-edge-side guide portion 152 are inserted into the insertion groove 164, the first long-edge-side guide portion 150 and the second long-edge-side guide portion 152 are pressed by the two sidewalls inside the insertion groove 164, and are corrected to follow the turn portion 142.

The inner peripheral tip of the second short-edge-side guide portion gripping portion 162 is provided with a restraining plate portion 166 that is adjacent to the bending portion gripping portion 160 and extends downward. The restraining plate portion 166 presses the top of the second short-edge-side guide portion 114 against the inner peripheral tip surface side of the block body portion 100 forming the support block 90.

The second short-edge-side guide portion gripping portion 162 grips the short extension region of the second short-edge-side guide portion 114 that is bent along a top surface from the inner peripheral tip surface of the block body portion 100, between itself and this top surface. As a result, the three-direction guide member 92 is stably supported by the support block 90 on one of the first long edge 28*a* side, the second long edge 28*b* side, and the second short edge 30*b* side of the slot 22.

A bolt stopping hole 168*a* and a pin insertion hole 170*a* penetrate through the second short-edge-side guide portion gripping portion 162 along the up-down direction, which is the thickness direction. The bolt stopping hole 168*a* is a stepped penetration hole in which the inner diameter of the lower portion is small and the inner diameter of the upper portion is large, includes a stepped portion formed by the inner diameter difference, and is connected overlapping the bolt fastening hole 108*a*. On the other hand, the inner diameter of the pin insertion hole 170*a*, which is connected overlapping the pin fitting hole 112*a*, is substantially constant.

The positioning pin 110*a* passes through the pin insertion hole 170*a* to be fitted into the fitting hole 112*a*, and serves to stop rotation of the outer cap member 94. Furthermore, the fastening bolt 106*a* passes through the bolt stopping hole 168*a* to be screwed into the bolt fastening hole 108*a*, thereby fastening the outer cap member 94 to the block body portion 100. The head portion of the fastening bolt 106*a* is blocked by the stepped portion in the bolt stopping hole 168*a*.

The driving slider 400, the first driven slider 402, and the second driven slider 404 each support two assemblies formed by a support block 90, a three-direction guide member 92, and an outer cap member 94. In other words, the first slider unit 406*a* holds six assemblies. The same is true for the remaining second slider unit 406*b* to twelfth slider unit 406*l*.

As described above, each assembly (a support block 90, a three-direction guide member 92, and an outer cap member 94) is supported by a driving slider 400, a first driven slider 402, or a second driven slider 404, via a bracket 64. Accordingly, each assembly progresses towards the inner peripheral side integrally with the driving slider 400, the first driven slider 402, or the second driven slider 404, in accordance with all the guide shafts 306 progressing in synchronization toward the inner peripheral side of the stator core 20. Essentially, the three-direction guide members 92 are gathered. In an opposite manner, in accordance with all the guide shafts 306 withdrawing in synchronization toward the outer peripheral side, each assembly is withdrawn integrally to the outer peripheral side and the three-direction guide members 92 are spread out radially.

Figure 10:
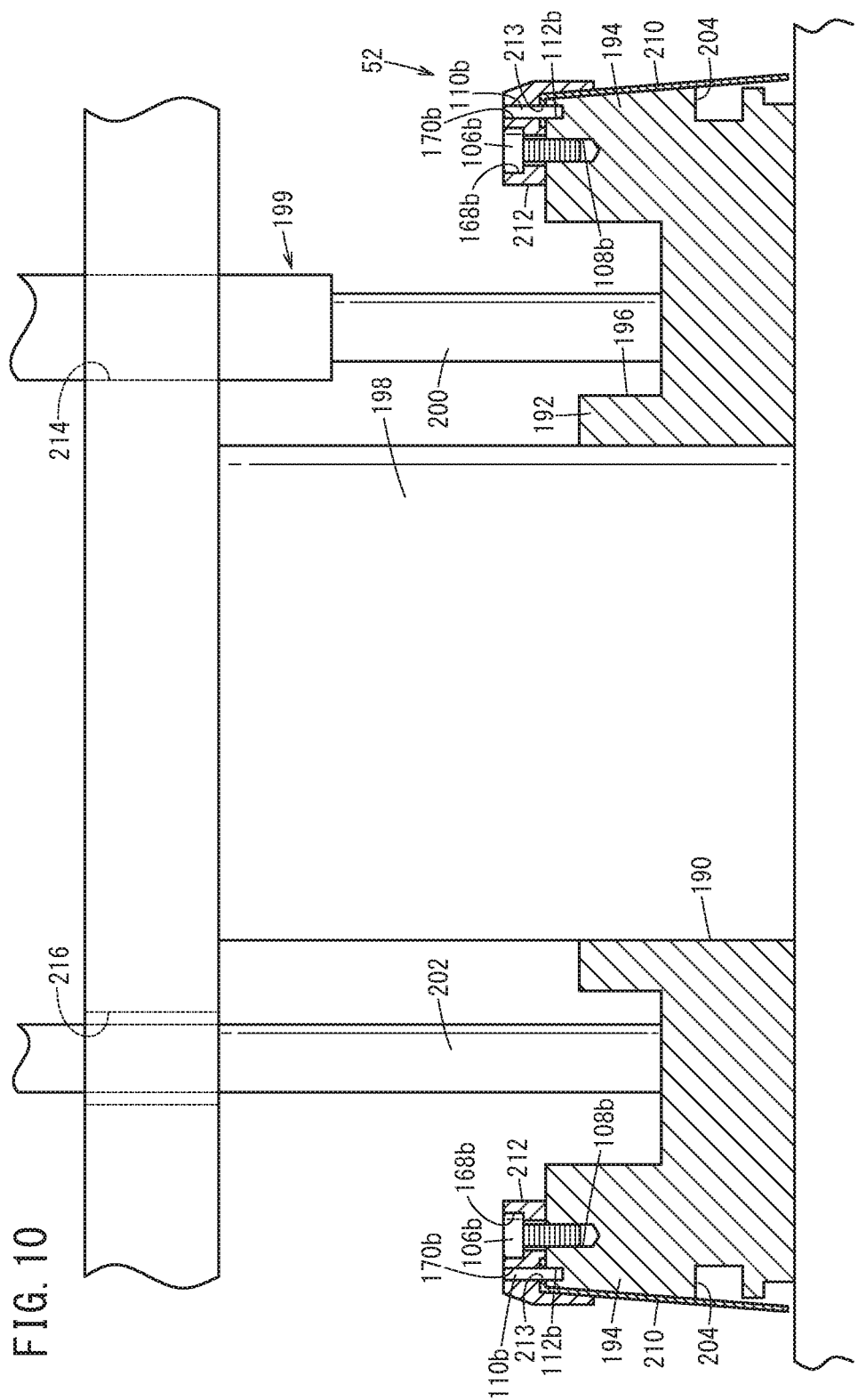
FIG. 10 is a cross-sectional side view of the main components of the inner guide portion.

As shown in FIG. 10, the inner guide portion 52 has an annular shape due to a reception hole 190 being formed in the center thereof, and includes an inner orbital wall portion 192 that rises and goes around the inner peripheral edge, and an outer orbital wall portion 194 that rises and goes around the outer peripheral edge. An annular recessed portion 196, which is relatively depressed, is formed between the inner orbital wall portion 192 and the outer orbital wall portion 194.

An entry shaft portion 198, which forms a holding mechanism that holds the segment 10 and is capable of being raised and lowered, enters the reception hole 190. Essentially, the entry shaft portion 198 enters the reception hole 190 by being lowered by the holding mechanism, and is withdrawn from the reception hole 190 by being raised by the holding mechanism.

The bottom end of a raising/lowering rod 200, which forms a raising/lowering cylinder 199, is connected to the annular recessed portion 196 (see FIG. 4). The raising/lowering cylinder 199 is an actuator that functions as an axial-direction (vertical-direction) displacement mechanism. Essentially, the inner guide portion 52 is raised up in accordance with the raising/lowering rod 200 being raised (withdrawn), and is lowered in accordance with the raising/lowering rod being lowered (moved forward). Furthermore, a guide bar 202 is inserted into the annular recessed portion 196 at a position where the phase difference from the raising/lowering rod 200 is substantially 180°. The bottom end of the guide bar 202 is connected to a support platform (not shown in the drawings) provided below the inner guide portion 52 in the leg insertion apparatus.

An engagement recessed portion 204 (first engagement portion) is formed in the side wall of the outer orbital wall portion 194, that is, the outer peripheral wall of the inner guide portion 52. As described further below, the engagement protrusion 144 provided to the support block 90 engages with the engagement recessed portion 204. At this time, there is a gap between the engagement protrusion 144 and the inner wall of the engagement recessed portion 204.

A one-direction guide member 210 (inner-edge-side guide portion), which functions as a first short-edge-side guide portion, is positionally fixed to the outer orbital wall portion 194 via the inner cap member 212 (inner-edge-side guide portion gripping portion). Essentially, the two bolt fastening holes 108*b* and the pin fitting hole 112*b* are formed with a staggered arrangement on the top surface of the outer orbital wall portion 194. Furthermore, a pin passage hole 213 penetrates through the one-direction guide member 210. Yet further, the bolt stopping hole 168*b*, which is a stepped penetration hole, and the pin insertion hole 170*b*, which has a substantially constant inner diameter, penetrate through the inner cap member 212, in the same manner as the bolt stopping hole 168*a* and the pin insertion hole 170*a*. The rotation of the inner cap member 212 and the one-direction guide member 210 is stopped by the positioning pin 110*b* fitted into the pin fitting hole 112*b* through the pin insertion hole 170*b* and the pin passage hole 213.

The inner cap member 212 is connected to the outer orbital wall portion 194 by the fastening bolt 106*b* screwed into the bolt fastening hole 108*b* through the bolt stopping hole 168*b*. The head portion of the fastening bolt 106*b* is blocked by the stepped portion inside the bolt stopping hole 168*b*.

The one-direction guide member 210 is inclined to approach the inner peripheral side of the stator core 20, heading from top to bottom. A slight clearance (retreat space) is formed between this one-direction guide member 210 and the bottom end of the outer orbital wall portion 194, and the one-direction guide member 210 faces the second short-edge-side guide portion 114 of the three-direction guide member 92.

The holding mechanism includes a clamp portion (not shown in the drawings) shaped as a circular plate, and the entry shaft portion 198 that protrudes and extends downward from the center of the clamp portion. The clamp portion holds the segment 10 with an orientation whereby the leg portions 12 face downward and the turn portion 14 faces upward. A rod insertion hole 214 and a bar insertion hole 216, through which the raising/lowering rod 200 and the guide bar 202 pass respectively, penetrate through the entry shaft portion 198. The phase difference between the rod insertion hole 214 and the bar insertion hole 216 is substantially 180°.

The leg portion insertion apparatus according to the present embodiment is basically configured as described above, and the following describes the operational effects thereof. The following work and operations are performed under the control of a control circuit (not shown in the drawings), unless otherwise specified.

The leg portion insertion apparatus operates in the following manner, in order to insert a leg portion 12 of the segment 10 into a slot 22. Essentially, first, an operator holds the stator core 20, in which the insulating paper IP (see FIG. 4) has been inserted in advance into the slot 22, at a prescribed region of the leg portion insertion apparatus. The stator core 20 is then raised, and transported to a position where the inner guide portion 52 is provided. At this point in time, as shown in FIG. 4, the stator core 20 is positioned relatively lower than the inner guide portion 52. Accordingly, the one-direction guide member 210 is positioned above the slot 22.

On the other hand, the clamp portion forming the holding mechanism holds the segment 10 with an orientation whereby the leg portion 12 faces downward and the turn portion 14 faces upward, and moves the segment 10 to a position above the stator core 20. At this time, the leg portion 12 is positioned above the slot 22. Furthermore, the first slider unit 406*a* to twelfth slider unit 406*l* are kept at the outer peripheral side of the stator core 20.

Next, the servomotors 304 forming the first actuator 302*a* to twelfth actuator 302*l* are energized. Due to this, the first slider unit 406*a* to twelfth slider unit 406*l*, which are formed integrally with the guide shafts 306, approach (progress forward) the stator core 20. The first slider unit 406*a* to twelfth slider unit 406*l* may be caused to progress forward simultaneously, but it is preferable that first the forward progression of the first slider unit 406*a* is finished, then the forward progression of the seventh slider unit 406*g* is finished, and then the remaining second slider unit 406*b* to sixth slider unit 406*f* and eighth slider unit 406*h* to twelfth slider unit 406*l* are caused to progress forward.

Figure 11:
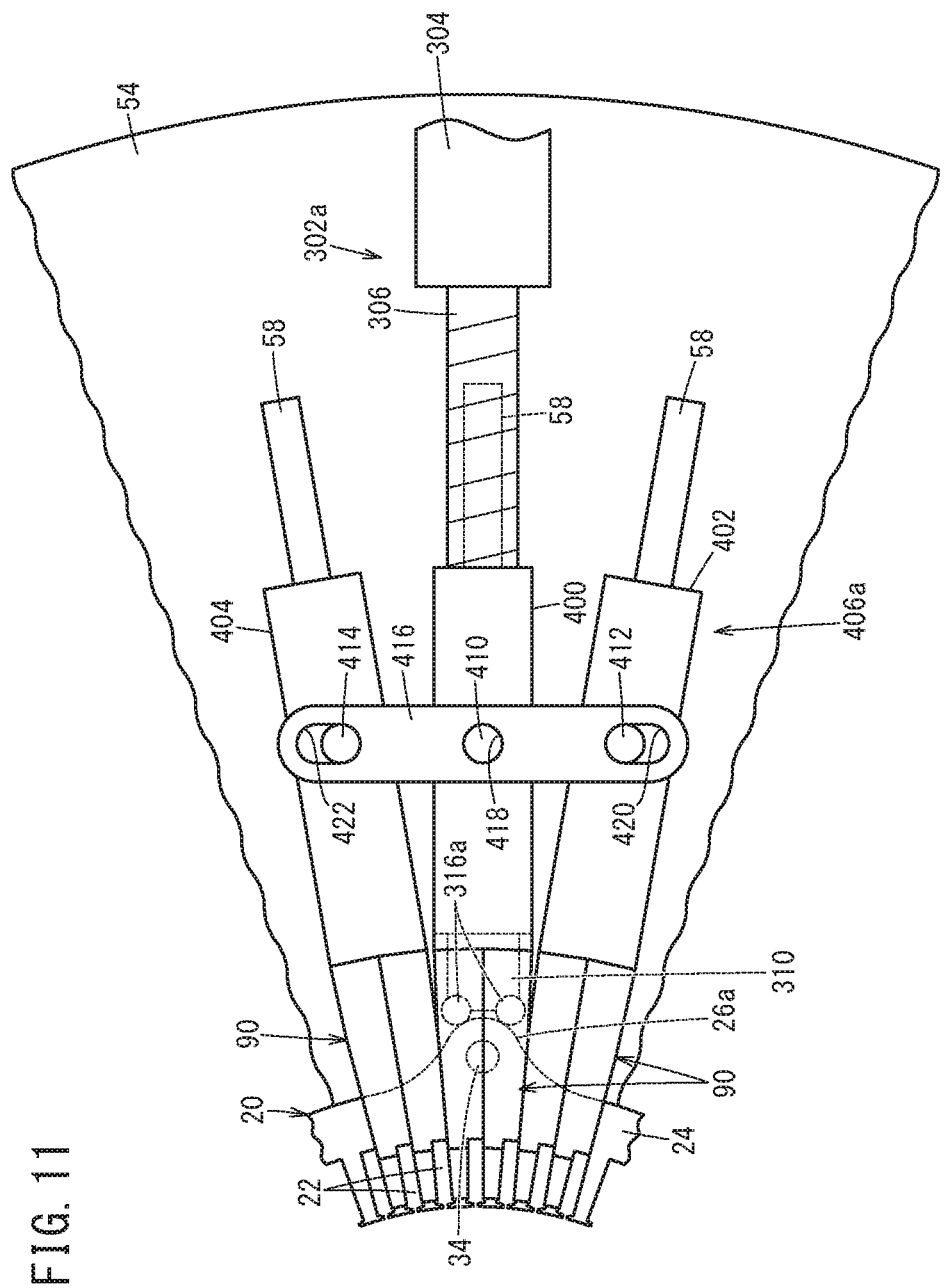
FIG. 11 is a perspective planar view of the main components shown in a state where the driving slider, the first driven slider, and the second driven slider have been displaced toward the inner peripheral side of the stator core from the state shown in FIG. 5.

More specifically, in each slider unit, the first driven slider 402 and the second driven slider 404 are connected to the driving slider 400 forming the slider unit, via the link member 416. Therefore, in accordance with the forward progress of the driving slider 400, the first driven slider 402 and the second driven slider 404 also progress forward toward the stator core 20. At this time, as shown in FIG. 11, the first displacement support cam follower 412 and the second displacement support cam follower 414 move to the driving slider 400 side inside the first long hole 420 and the second long hole 422. Therefore, it is possible for the first driven slider 402 and the second driven slider 404 to progress forward along with the driving slider 400. When the driving slider 400, the first driven slider 402, and the second driven slider 404 progress forward, the sliding body 60 slides along the guide rail 58.

The driving slider 400 of the first actuator 302a is provided with the engagement element 310 and the tip thereof is provided with the alignment cam followers 316a, and the driving slider 400 of the seventh actuator 302g is provided with the sub-engagement element 312 and the tip thereof is provided with the alignment cam followers 316b (see FIG. 4). Therefore, even when the first tab portion 26a has experienced a significant positional skew relative to the engagement element 310 as shown by the virtual lines in FIG. 6, after the alignment cam followers 316a have contacted the outer wall of the first tab portion 26a, the alignment cam followers 316a progress farther forward to press the first tab portion 26a. Due to this pressing, the orientation of the stator core 20 is corrected via the first tab portion 26a. As a result, the first tab portion 26a enters (is engaged) between the alignment cam followers 316a, and this causes the first tab portion 26a to be aligned by the alignment cam followers 316a.

Next, the sub-engagement element 312 contacts the outer wall of the fourth tab portion 26d. Due to the same reason as described above, even when the fourth tab portion 26d experiences a significant positional skew relative to the sub-engagement element 312, the alignment cam followers 316b correct the orientation of the stator core 20 via the fourth tab portion 26d, and therefore the fourth tab portion 26d enters and is engaged between the alignment cam followers 316b. In this state, the first actuator 302a and the seventh actuator 302g press the first tab portion 26a and the fourth tab portion 26d to the inner peripheral side via the engagement element 310 and the sub-engagement element 312. That is, the stator core 20 is gripped by the engagements at the two locations described above, thereby positionally fixing the stator core 20.

Next, the pressing elements 314 of the third actuator 302c, the fifth actuator 302e, the ninth actuator 302i, and the eleventh actuator 302k respectively contact the tips of the second tab portion 26b, the third tab portion 26c, the fifth tab portion 26e, and the sixth tab portion 26f. Furthermore, the pressing element 314 of the second actuator 302b contacts the outer edge between the first tab portion 26a and the second tab portion 26b, and the pressing element 314 of the fourth actuator 302d contacts an outer edge between the second tab portion 26b and the third tab portion 26c. Similarly, the pressing elements 314 of the sixth actuator 302f, the eighth actuator 302h, the tenth actuator 302j, and the twelfth actuator 302l respectively contact the outer edge between the third tab portion 26c and the fourth tab portion 26d, the outer edge between the fourth tab portion 26d and the fifth tab portion 26e, the outer edge between the fifth tab portion 26e and the sixth tab portion 26f, and the outer edge between the sixth tab portion 26f and the first tab portion 26a. As a result, the state shown in FIG. 12 is reached. In this state, the second actuator 302b to sixth actuator 302f and the eighth actuator 302h to twelfth actuator 302l press the stator core 20 to the inner peripheral side via the pressing elements 314.

By pressing the stator core 20 toward the inner peripheral side with the first actuator 302a to twelfth actuator 302l in the manner described above, the stator core 20 is firmly positionally fixed.

Figure 13:
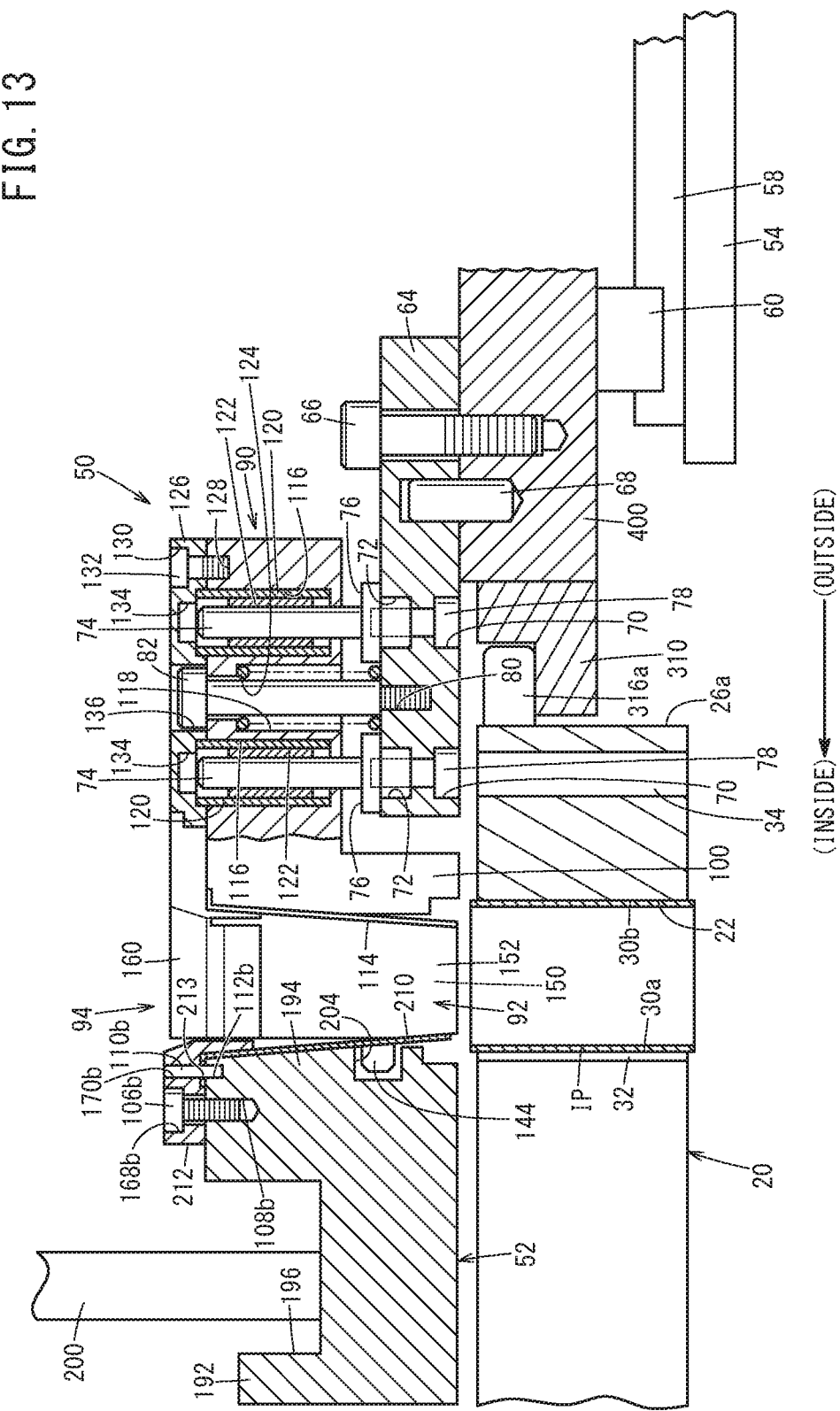
FIG. 13 is a side view of the main components showing a state in which the slider unit included in the outer guide portion has been displaced toward the inner guide portion from the state shown in FIG. 4.

Furthermore, in accordance with the displacement (forward progression) of the first slider unit 406a to twelfth slider unit 406l toward the stator core 20 as described above, as shown by FIG. 13, the support blocks 90, the three-direction guide members 92, and the outer cap members 94 are displaced along the diameter direction of the stator core 20 in a manner to approach the stator core 20, in other words, in a manner to be gathered on the inner peripheral side of the stator core 20. As a result, the engagement protrusion 144 engages with the engagement recessed portion 204, and the three-direction guide member 92 is positioned on the slot 22 while being near the one-direction guide member 210. A gap is created between the engagement protrusion 144 and the inner wall of the engagement recessed portion 204.

Figure 14:
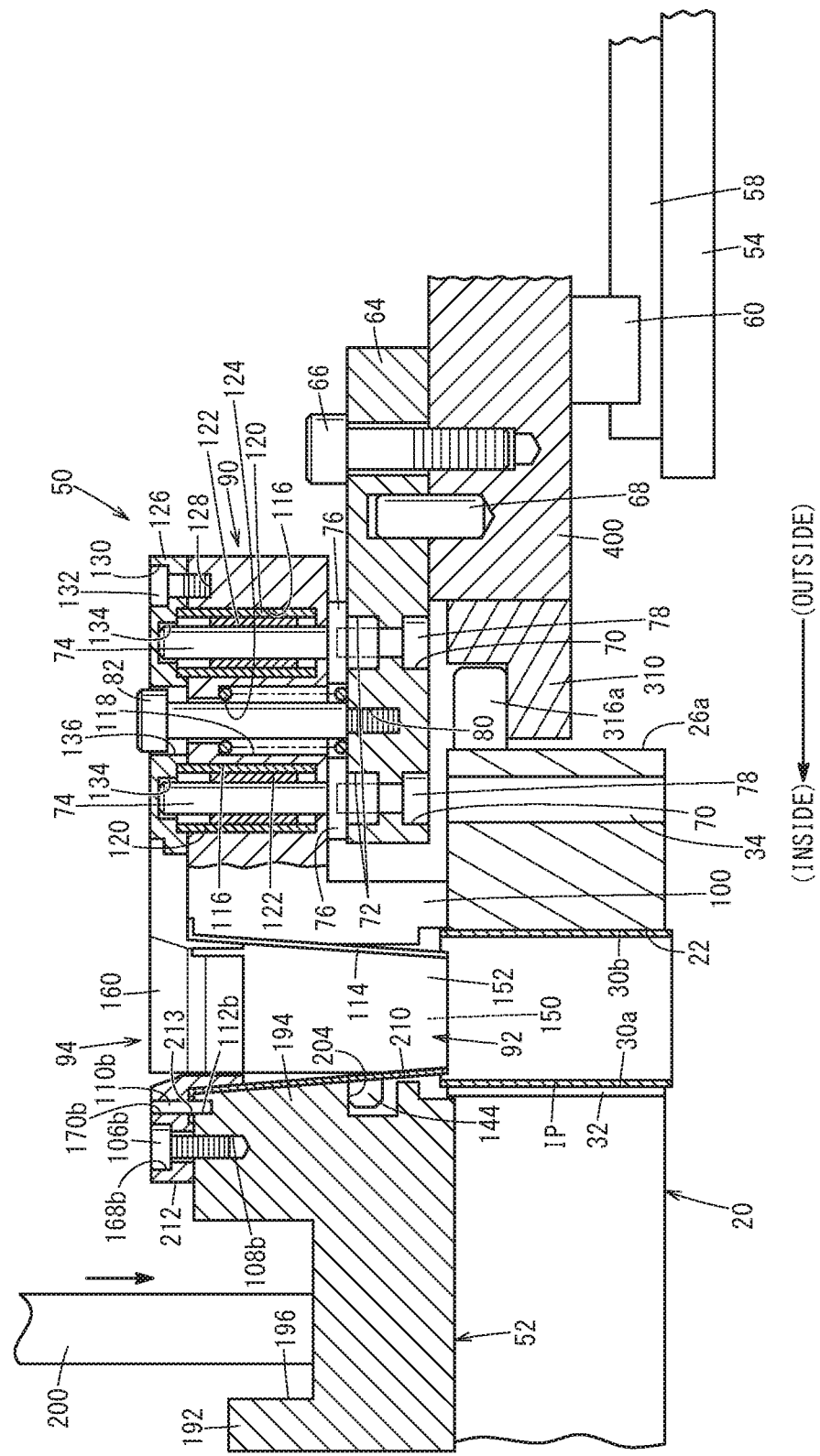
FIG. 14 is a side view of the main components showing a state in which the slider unit and the inner guide portion have been lowered and the bottom end of the three-direction guide member have drawn near the slot from the state shown in FIG. 13.

Next, as shown in FIG. 14, the raising/lowering cylinder 199 is biased to cause the raising/lowering rod 200 to progress forward (be lowered). In accordance with this, the inner guide portion 52 is lowered toward the stator core 20 while being guided by the guide bar 202. As a result, the engagement protrusion 144 provided to the support block 90 contacts the ceiling wall of the engagement recessed portion 204 formed in the outer orbital wall portion 194. After this contact, the engagement protrusion 144 is pressed by the ceiling portion of the engagement recessed portion 204 of the inner guide portion 52 being lowered. Accordingly, the support block 90 starts to be lowered following the inner guide portion 52.

The support block 90 is guided by the guide rod 74 and the guide bolt 82 when being lowered. Furthermore, in accordance with the lowering of the support block 90, the coil spring 124 is compressed along the guide bolt 82. Furthermore, the slide guide 122 slides relative to the guide rod 74. Therefore, the first slider unit 406a to twelfth slider unit 406l, the platform 54, and the like are kept at this position, without being lowered.

Due to the lowering of the support block 90, as shown in FIG. 9, the bottom end of the one-direction guide member 210 approaches the first short edge 30a on the inner peripheral side of the slot 22. In this same slot 22, the second long-edge-side guide portion 152 and the second short-edge-side guide portion 114 of one three-direction guide member 92 (first three-direction guide member 92a) respectively approach the second long edge 28b and the second short edge 30b. Furthermore, the first long-edge-side guide portion 150 of another three-direction guide member 92 (second three-direction guide member 92b) approaches the first long edge 28a of this slot 22. The first long-edge-side guide portion 150 of the three-direction guide member 92 approaches the first long edge 28a of a slot 22 that is adjacent to the above-mentioned slot 22 on the upstream side in the clockwise direction.

The lowering of the inner guide portion 52 and the support block 90 is stopped due to the bottom surface of the inner guide portion 52 sitting on the top surface of the high-altitude portion.

Figure 15:
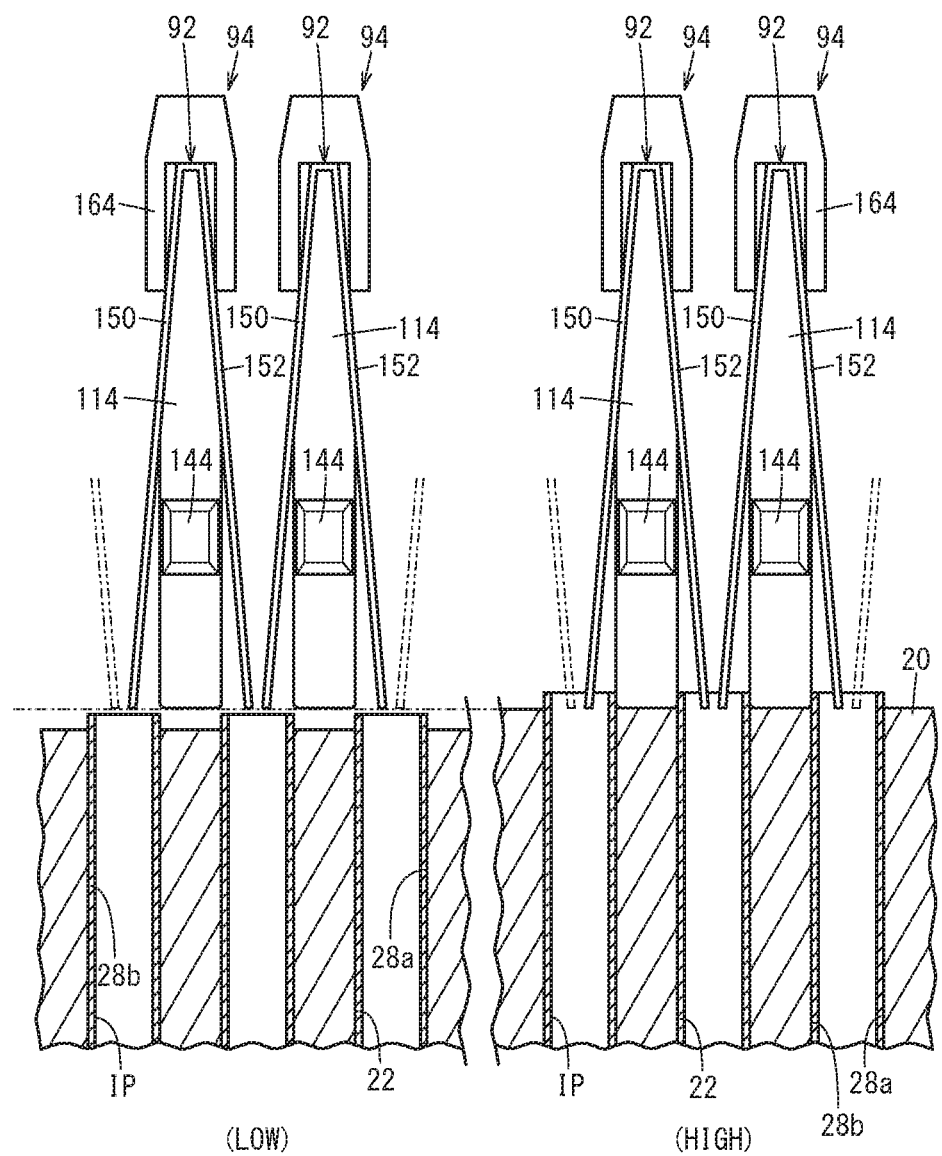
FIG. 15 is a schematic front view of the main components showing the positional relationship between the slot and insulating paper and the three-direction guide member at the high region (high-altitude region) and the low region (low-altitude region) of the stator core.

In a case where there is variation in the height of the stator core 20, at the point in time when the lowering of the support block 90 is finished at a region where the height is large (high-altitude region), the state shown in FIGS. 14 and 15 is realized. Specifically, the top end of the insulating paper IP inserted in advance into the slot 22 is pressed and widen toward each inner wall side of the slot 22, by the bottom end of each of the one-direction guide member 210, the second long-edge-side guide portion 152, the second short-edge-side guide portion 114, and the first long-edge-side guide portion 150 near the slot 22. In other words, the top end of the insulating paper IP is covered by the back surface of the bottom end of each of the one-direction guide member 210, the second long-edge-side guide portion 152, the second short-edge-side guide portion 114, and the first long-edge-side guide portion 150. Due to this, the insulating paper IP is positionally fixed.

Inside this same slot 22, the one-direction guide member 210, the second long-edge-side guide portion 152, the second short-edge-side guide portion 114, and the first long-edge-side guide portion 150 become closer, heading downward (see FIG. 15). Essentially, the internal space formed by the one-direction guide member 210, the second long-edge-side guide portion 152, the second short-edge-side guide portion 114, and the first long-edge-side guide portion 150 contracts as the position becomes lower.

In contrast to this, as shown in FIG. 15, at a region where the height is small (low-altitude region), it is possible that the bottom end of each of the one-direction guide member 210, the second long-edge-side guide portion 152, the second short-edge-side guide portion 114, and the first long-edge-side guide portion 150 does not yet contact the insulating paper IP inside the slot 22. Accordingly, inside the support block 90 corresponding to the low-altitude position, the coil spring 124 is not sufficiently compressed.

Figure 16:
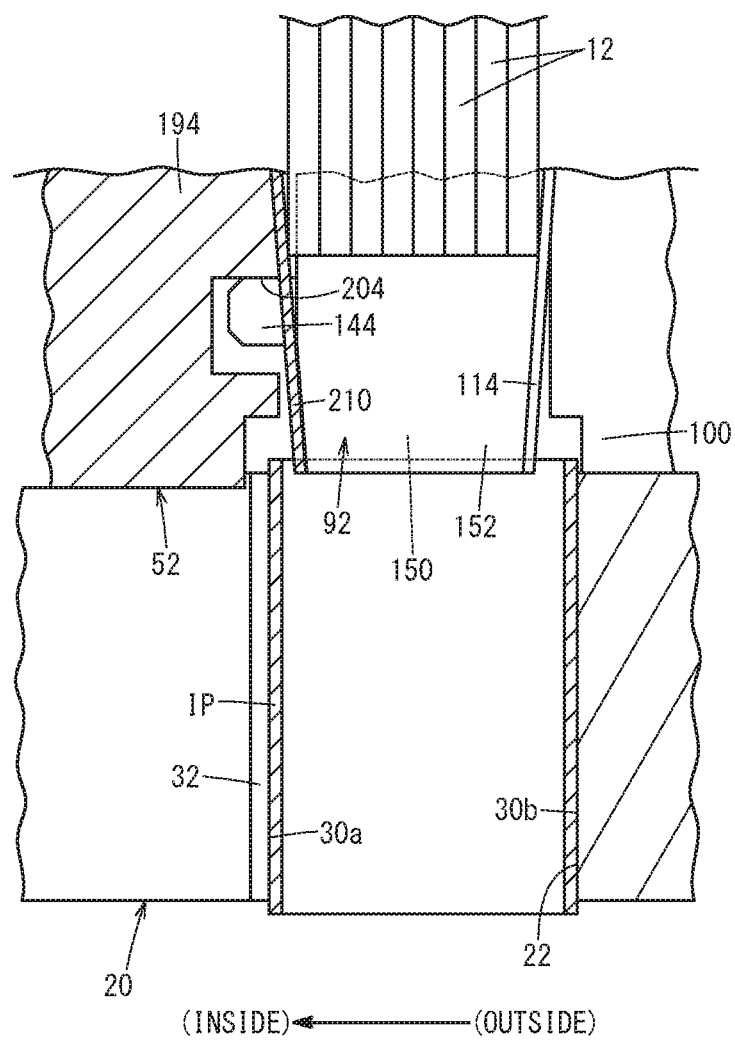
FIG. 16 is an enlarged cross-sectional view of the main components showing a state in which the leg portion of the segment has moved toward the slot, at the high-altitude position.

Next, in this state, the clamp portion is lowered. Therefore, as shown in FIG. 16, the leg portions 12 of a plurality of segments 10 are inserted simultaneously into the internal space. After this, when the clamp releases each segment 10, all of the leg portions 12 slide along the one-direction guide member 210, the second long-edge-side guide portion 152, the second short-edge-side guide portion 114, and the first long-edge-side guide portion 150 to enter into a prescribed slot 22.

During this sliding, friction force is generated between the leg portions 12 moving downward and the one-direction guide member 210, second long-edge-side guide portion 152, second short-edge-side guide portion 114, and first long-edge-side guide portion 150. This friction force is transmitted to the support block 90 via the second long-edge-side guide portion 152, the second short-edge-side guide portion 114, and the first long-edge-side guide portion 150, and therefore the support block 90 is pressed to the bracket 64 side.

As described above, the support block 90 is supported by the bracket 64 in a floating manner. Furthermore, inside the support block 90 corresponding to the low-altitude region, the coil spring 124 is not sufficiently compressed. Accordingly, at the low-altitude region, the support block 90 that is pressed by the friction force can be displaced toward the bracket 64, in other words, lowered, while compressing the coil spring 124 (see FIG. 17).

Here, the engagement protrusion 144 is inserted into the engagement recessed portion 204, with a gap therebetween (see FIG. 14). Accordingly, even when the bracket 64 is lowered, all that happens is that the engagement protrusion 144 moves away from the ceiling wall of the engagement recessed portion 204. Therefore, it is possible to avoid having the engagement protrusion 144 interfere with the floor wall of the engagement recessed portion 204, which would result in the support block 90 being blocked and the lowering being obstructed.

Figure 17:
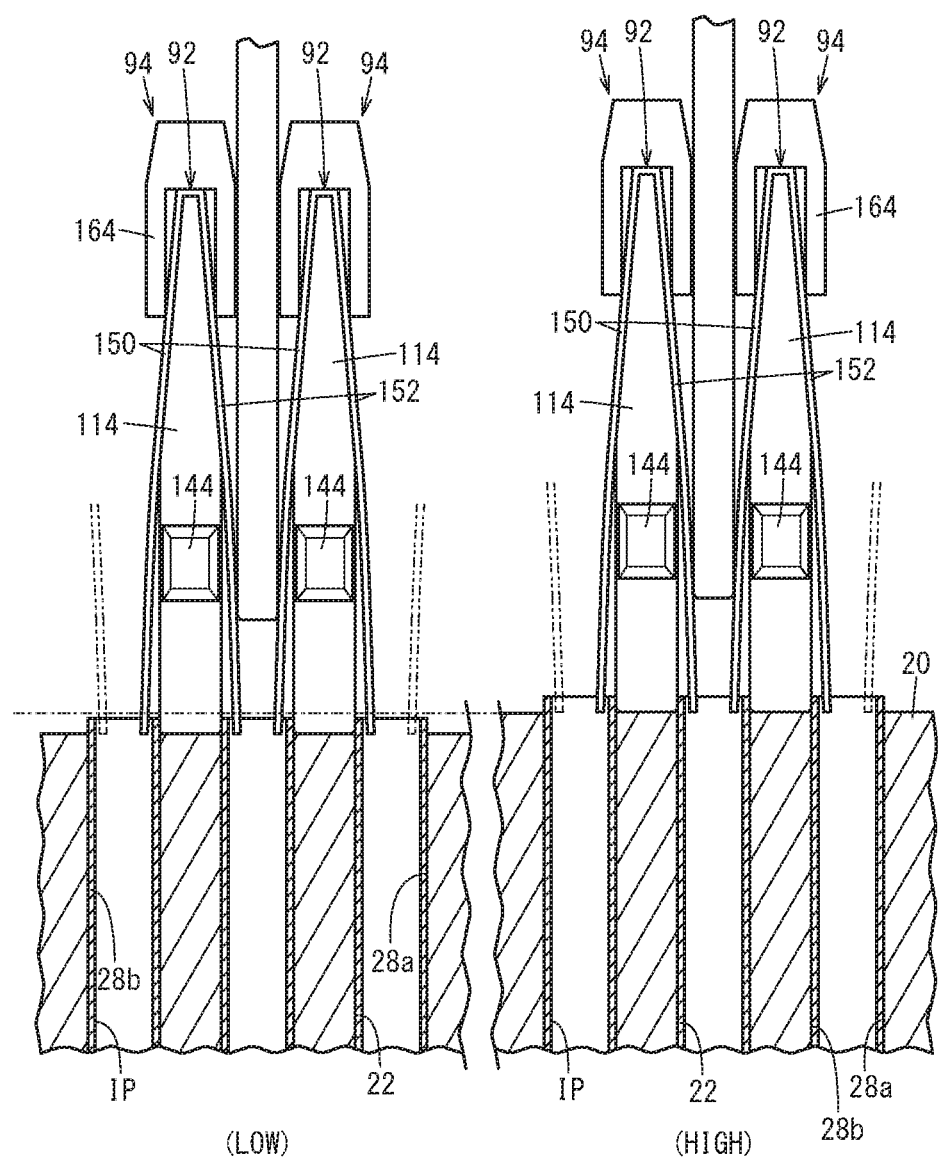
FIG. 17 is a schematic front view of the main components showing the positional relationship between the slot and insulating paper and the three-direction guide member after the support body corresponding to the low-altitude region has been displaced, at the high-altitude region and the low-altitude region.

Due to reasons such as described above, the support block 90 corresponding to the low-altitude region is slightly lowered as shown in FIG. 17, according to the leg portion 12 sliding along the one-direction guide member 210, the second long-edge-side guide portion 152, the second short-edge-side guide portion 114, and the first long-edge-side guide portion 150. As a result, at the low-altitude region, in the same manner as at the high-altitude region, the top end of the insulating paper IP in the slot 22 is covered by the back surface of the bottom end of each of the one-direction guide member 210, the second long-edge-side guide portion 152, the second short-edge-side guide portion 114, and the first long-edge-side guide portion 150. Due to this, the insulating paper IP is positionally fixed.

In this way, according to the present embodiment in which the support block 90 is supported in a floating manner, even if there is variation in the height of the stator core 20, the pieces of insulating paper IP in all of the slots 22 can be pressed to the inner wall sides of the slots 22 by the one-direction guide member 210, the second long-edge-side guide portion 152, the second short-edge-side guide portion 114, and the first long-edge-side guide portion 150.

Furthermore, in the present embodiment, all of the leg portions 12 can be inserted into the slots 22 with a single operation, as described above. Since the internal space contracts heading downward, even if a leg portion 12 experiences a significant positional skew relative to a slot 22, the positional skew of the leg portion 12 is corrected and the leg portion 12 is accurately guided into the slot 22. When the leg portion 12 is inserted into the slot 22, the second short-edge-side guide portion 114 and the one-direction guide member 210 elastically bend slightly toward the outer orbital wall portion 194. Therefore, the clearance between the second short-edge-side guide portion 114 and the bottom end of the block body portion 100 and the clearance between the one-direction guide member 210 and the bottom end of the outer orbital wall portion 194, that is, the retreat space, becomes smaller.

The top end of the insulating paper IP is covered by the back surface of the bottom end of each of the one-direction guide member 210, the second long-edge-side guide portion 152, the second short-edge-side guide portion 114, and the first long-edge-side guide portion 150, and this top end is not exposed. Therefore, the leg portion 12 that has entered into the slot 22 is prevented from being caught on the insulation paper IP. Accordingly, it is possible to avoid cases where the insulating paper IP is pressed out from the slot 22 due to receiving pressing from the leg portion 12 and damaged. That is, the insulating paper IP is reliably interposed between the leg portion 12 and the inner wall of the slot 22, and as a result, a short circuit caused by insulation being formed between the segment 10 and the stator core 20 is prevented.

Figure 18:
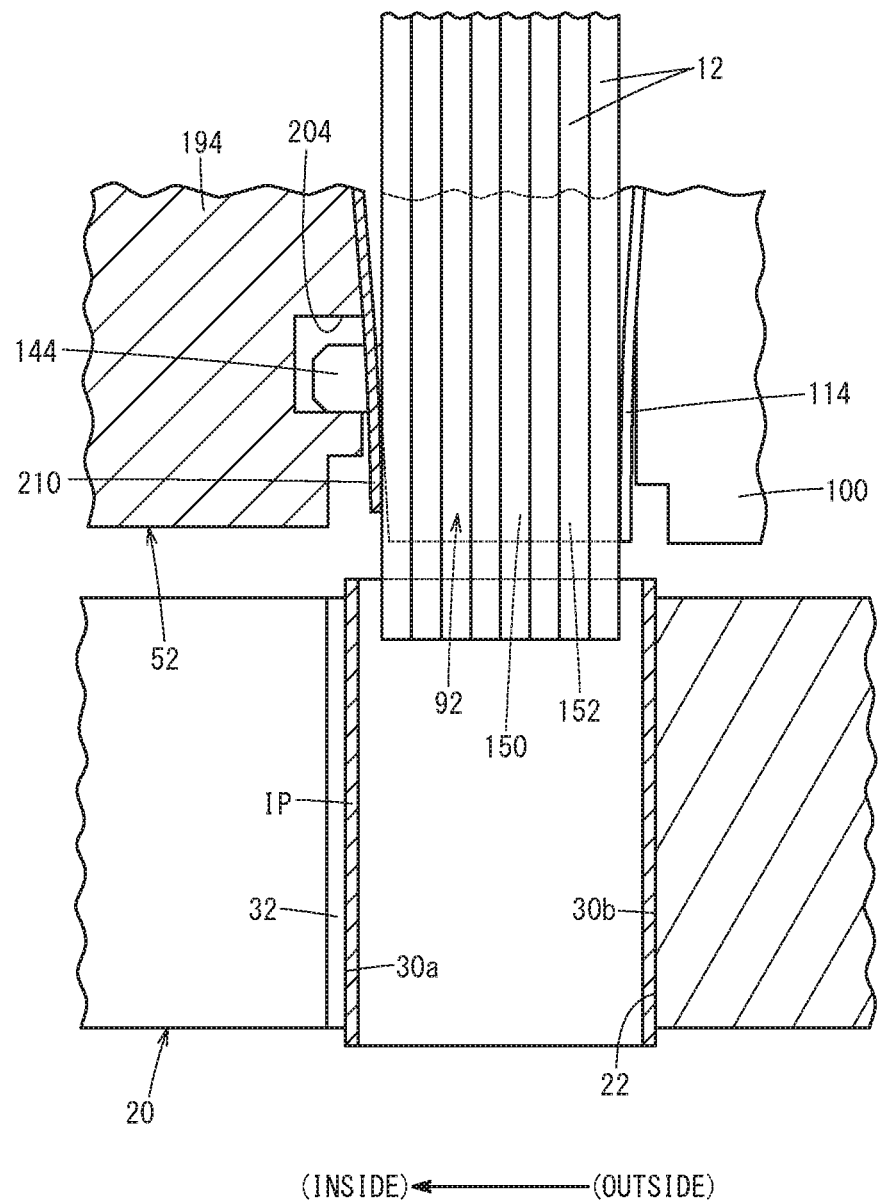
FIG. 18 is a cross-sectional view of the main components showing a state in which the inner guide portion and the support block have been raised after the tip of the leg portion of the segment has been inserted.

After the tip of the leg portion 12 has been inserted into the slot 22 in this manner, the raising/lowering rod 200 is raised, as shown in FIG. 18. In accordance with this raising, the inner guide portion 52 is raised while being guided by the guide bar 202, and the support block 90 follows this raising in an integrated manner. At this time, the coil spring 124 expands, and the slide guide 122 slides relative to the guide rod 74. Due to the raising described above, the one-direction guide member 210, the second long-edge-side guide portion 152, the second short-edge-side guide portion 114, and the first long-edge-side guide portion 150 are raised away from the slot 22.

Figure 19:
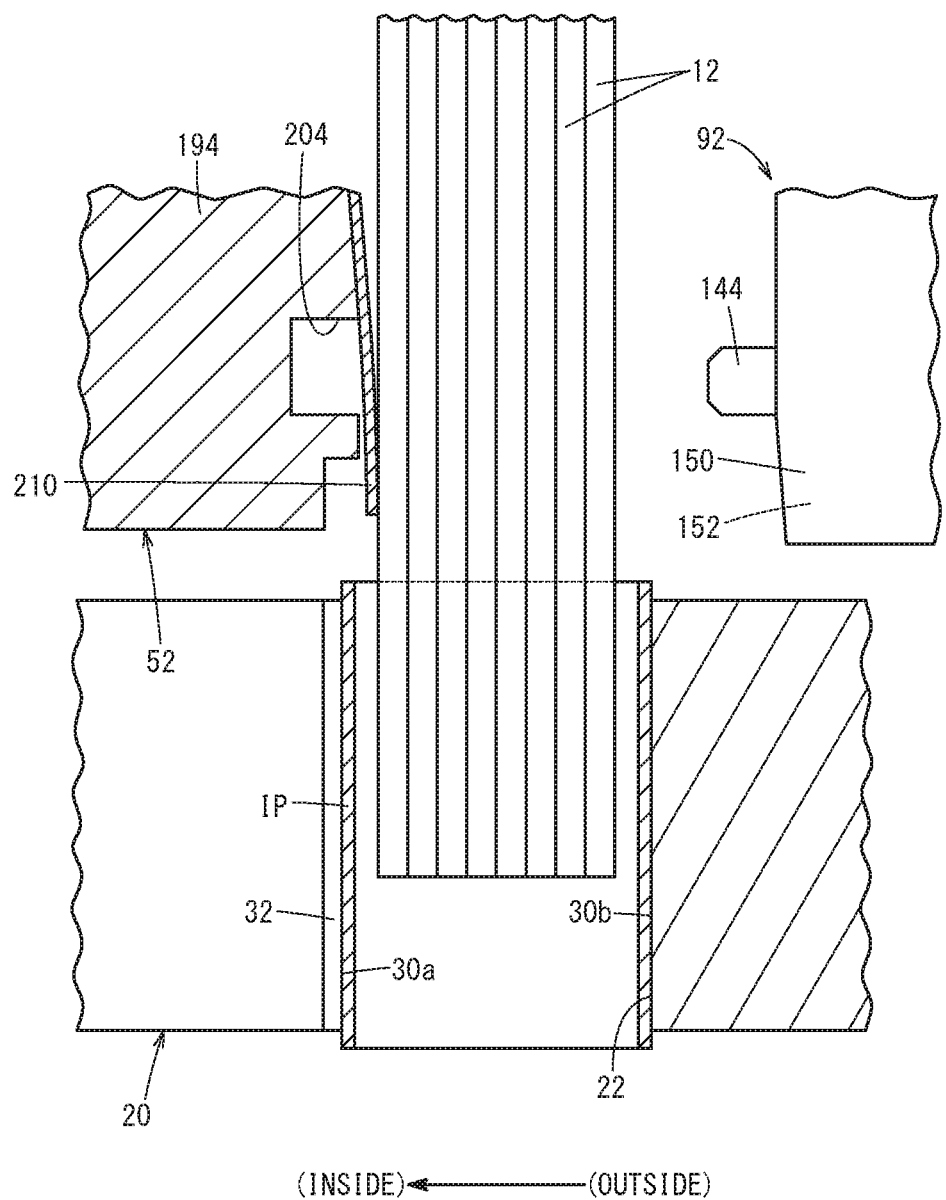
FIG. 19 is a cross-sectional view of the main components showing a state in which the outer guide portion has been moved away from the inner guide portion, from the state shown in FIG. 18.

Next, the servo motors 304 of the first actuator 302a to twelfth actuator 302l are energized to withdraw the guide shafts 306 (see FIG. 2). Due to this, the first slider unit 406a to twelfth slider unit 406l are spread out in a radial shape toward the circumferential outside of the stator core 20, and the stator core 20 is released from the restraint of the driving sliders 400 (engagement element 310, sub-engagement element 312, and pressing elements 314). Furthermore, at this time, the engagement protrusion 144 is removed from the engagement recessed portion 204, and the connection between the inner guide portion 52 and the outer guide portion 50 is dissolved. In other words, the state shown in FIG. 19 is realized (see FIG. 4 as well).

Due to this, the leg portion 12 is released from being gripped by the inner guide portion 52 and the support block 90. Accordingly, after this, the leg portion 12 moves easily into the slot 22. That is, the leg portion 12 is inserted into the slot 22 while sliding directly on the insulating paper IP.

Figure 20:
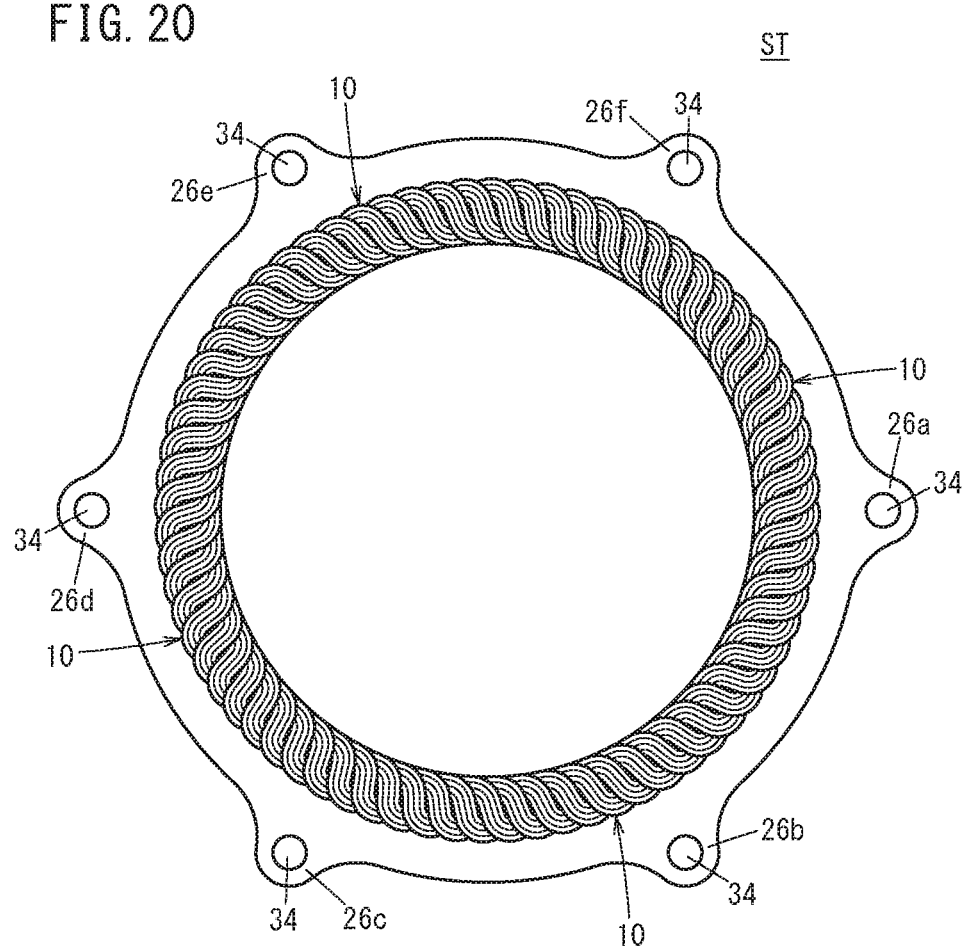
FIG. 20 is a schematic planar view of a stator formed by inserting the segment into the slot of the stator core.

The stator core 20 in which the leg portions 12 have been inserted to the slots 22 is transported to a station where the next operation is performed. At this station, twisting of the segments 10 and the joining of the leg portions 12 are performed, and as a result, the stator ST shown in FIG. 20 is obtained.

In the manner described above, according to the present embodiment, when the leg portions 12 of the segments 10 are inserted into the slots 22, the stator core 20 is not pressed by a pressing body. Therefore, it is possible to avoid pressing marks being formed in the stator core 20. As a result, a stator ST with an excellent aesthetic appearance can be obtained.

The present invention is not limited to the above described embodiments, and it is apparent that various alterations and improvements can be added without deviating from the scope of the present invention.

For example, in the above embodiment, the three-direction guide member 92 (92a, 92b) can float by having the support block 90 supported on the bracket 64 in a floatable manner, but the three-direction guide member 92 (92a, 92b) may instead be attached in a floatable manner to the support block 90.

Furthermore, the second short-edge-side guide portion 114 may be brought near the same slot 22 as the first long-edge-side guide portion 150 of the three-direction guide member 92 including this second short-edge-side guide portion 114.

Furthermore, the actuators may be cylinders, or may be ball screw mechanisms.

Yet further, the bottom end of the one-direction guide member 210 and the bottom end of the three-direction guide member 92 may be caused to enter into the slot 22.

What is claimed is:

1. An electric conductor insertion apparatus that inserts a prescribed region of an electric conductor into a slot of a stator core in which a plurality of the slots are formed, where each slot includes diameter-direction edges extending along a diameter direction of the stator core and circumferential-direction edges extending in a circumferential direction of the stator core and has insulating paper arranged therein, the electric conductor insertion apparatus comprising:
   a conductor guide member that guides the prescribed region of the electric conductor into the slot; and
   a support body that supports the conductor guide member and is configured to be positioned so that the conductor guide member is on the slot, wherein
   the conductor guide member is provided in a manner to be floatable in an axial direction of the stator core when the conductor guide member is positioned on the slot such that a friction force between the electric conductor and the conductor guide member moves the conductor guide member in the axial direction of the stator core and into the slot.

2. The electric conductor insertion apparatus according to claim 1, comprising:
   a holding member that holds the support body, wherein
   the support body is supported in a floating manner relative to the holding member by an elastic member that elastically biases the support body away from the holding member.

3. The electric conductor insertion apparatus according to claim 2, comprising:
   support body guide members that guide the support body when the support body supported in the floating manner is displaced.

4. The electric conductor insertion apparatus according to claim 3, wherein
   the support body guide members are housed in insertion holes formed in the support body.

5. The electric conductor insertion apparatus according to claim 1, further comprising:
   a second support body, wherein
   the second support body supports a second conductor guide member that guides the electric conductor into the slot.

6. The electric conductor insertion apparatus according to claim 5, wherein
   the second support body is provided with a first engagement portion,
   the support body is provided with a second engagement portion that engages with the first engagement portion, and
   the electric conductor insertion apparatus comprises an actuator that displaces, in an integrated manner, the second support body and the support body, which are connected to each other by engaging the second engagement portion with the first engagement portion.

7. The electric conductor insertion apparatus according to claim 6, wherein
   the first engagement portion and the second engagement portion engage with each other in a state where there is a gap therebetween.

8. The electric conductor insertion apparatus according to claim 5, wherein
   the second conductor guide member includes a region that guides the electric conductor along the circumferential-direction edges of the slot.

9. The electric conductor insertion apparatus according to claim 1, wherein
   the conductor guide member includes a region that guides the electric conductor along the diameter-direction edges of the slot.

10. The electric conductor insertion apparatus according to claim 9, wherein
    the conductor guide member includes two regions,
    one of the regions faces one slot of the plurality of slots, and
    the remaining one region faces another slot of the plurality of slots that is adjacent to the one slot of the plurality of slots.

* * * * *